US011581923B2

(12) United States Patent
John Wilson et al.

(10) Patent No.: US 11,581,923 B2
(45) Date of Patent: Feb. 14, 2023

(54) MULTIPLE USER PORT LOADING INDICATION

(71) Applicant: Qualcomm Incorporated, San Diego, CA (US)

(72) Inventors: Makesh Pravin John Wilson, San Diego, CA (US); June Namgoong, San Diego, CA (US); Yu Zhang, Beijing (CN); Alexandros Manolakos, San Diego, CA (US); Jing Sun, San Diego, CA (US); Tao Luo, San Diego, CA (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 16/488,235

(22) PCT Filed: Apr. 4, 2018

(86) PCT No.: PCT/CN2018/081879
§ 371 (c)(1),
(2) Date: Aug. 22, 2019

(87) PCT Pub. No.: WO2018/184559
PCT Pub. Date: Oct. 11, 2018

(65) Prior Publication Data
US 2021/0306037 A1    Sep. 30, 2021

(30) Foreign Application Priority Data

Apr. 6, 2017   (WO) ................ PCT/CN2017/079563

(51) Int. Cl.
*H04W 4/00*    (2018.01)
*H04B 7/0452*   (2017.01)
(Continued)

(52) U.S. Cl.
CPC ....... *H04B 7/0452* (2013.01); *H04L 25/0202* (2013.01); *H04W 72/04* (2013.01)

(58) Field of Classification Search
CPC .. H04W 72/042; H04W 76/27; H04L 5/0053; H04L 1/1812; H04L 5/0055
See application file for complete search history.

(56) References Cited

U.S. PATENT DOCUMENTS

| | | | |
|---|---|---|---|
| 9,094,074 B2 | 7/2015 | Gorokhov et al. | |
| 2011/0171964 A1* | 7/2011 | Lin | H04L 5/0023 455/450 |

(Continued)

FOREIGN PATENT DOCUMENTS

| | | |
|---|---|---|
| CN | 102076076 A | 5/2011 |
| CN | 102122984 A | 7/2011 |

(Continued)

OTHER PUBLICATIONS

International Search Report and Written Opinion—PCT/CN2018/081879—ISA/EPO—dated Jun. 26, 2018 (173727WO2).
(Continued)

*Primary Examiner* — Atique Ahmed
(74) *Attorney, Agent, or Firm* — Holland & Hart LLP

(57) ABSTRACT

Methods, systems, and devices for wireless communication are described. In multi-user (MU) multiple-input multiple-output (MIMO) wireless communications systems, a base station may perform signaling to indicate information related to ports assigned to one or more UEs. The base station may also signal information regarding ports shared with other UEs, which the UE may use when performing channel estimation. In some examples, the base station may signal a number of ports used per sub-band to the UE or a number of demodulation reference signal (DMRS) ports used by the UE. The base station may signal a sub-set of a total number of ports that are shared by other UEs overlap- (Continued)

ping with the resource allocation of the UE. The signaling may indicate a number of combs used by the base station in the resource allocation for the UE.

27 Claims, 16 Drawing Sheets

(51) Int. Cl.
*H04L 25/02* (2006.01)
*H04W 72/04* (2023.01)

(56) References Cited

U.S. PATENT DOCUMENTS

| | | | | |
|---|---|---|---|---|
| 2012/0275414 | A1* | 11/2012 | Hu | H04B 7/0452 370/329 |
| 2013/0039284 | A1* | 2/2013 | Marinier | H04L 5/001 370/329 |
| 2013/0039349 | A1* | 2/2013 | Ebrahimi Tazeh Mahalleh | H04L 5/0048 370/336 |
| 2013/0044664 | A1* | 2/2013 | Nory | H04L 1/0045 370/336 |
| 2013/0128852 | A1* | 5/2013 | Xue | H04W 72/1252 370/329 |
| 2014/0233407 | A1* | 8/2014 | Pourahmadi | H04L 5/0073 370/252 |
| 2015/0223210 | A1* | 8/2015 | Guo | H04W 72/04 370/329 |
| 2016/0142115 | A1 | 5/2016 | Onggosanusi et al. | |
| 2017/0093469 | A1* | 3/2017 | Nayeb Nazar | H04B 7/0452 |
| 2019/0013977 | A1* | 1/2019 | Harrison | H04L 5/0048 |
| 2019/0334751 | A1* | 10/2019 | Liu | H04L 5/0094 |
| 2020/0028643 | A1* | 1/2020 | Kim | H04W 72/04 |
| 2020/0083945 | A1* | 3/2020 | Lindbom | H04L 5/0016 |

FOREIGN PATENT DOCUMENTS

| | | | | |
|---|---|---|---|---|
| CN | 102474328 | A | 5/2012 | |
| CN | 103563268 | A | 2/2014 | |
| CN | 104247359 | A | 12/2014 | |
| CN | 104753838 | A | 7/2015 | |
| CN | 106685580 | A | 5/2017 | |
| EP | 2524559 | A1 | 11/2012 | |
| EP | 2648448 | A1 * | 10/2013 | H04B 7/0452 |
| EP | 2830247 | A1 | 1/2015 | |
| WO | WO-2011002958 | A1 | 1/2011 | |
| WO | WO-2011019962 | A2 | 2/2011 | |
| WO | WO-2011047351 | A2 | 4/2011 | |
| WO | WO-2016080734 | A1 | 5/2016 | |
| WO | WO 2016080737 | A1 | 5/2016 | |

OTHER PUBLICATIONS

International Search Report and Written Opinion—PCT/CN2017/079563—ISA/EPO—dated Jan. 3, 2018 (173727WO1).
Supplementary European Search Report—EP18781198—Search Authority—Munich—dated Oct. 15, 2020 (173727EP).

* cited by examiner

MULTIPLE USER PORT LOADING INDICATION

CROSS REFERENCES

The present Application is a 371 national phase filing of International Patent Application No. PCT/CN2018/081879 by John Wilson et al., tided "MULTIPLE USER PORT LOADING INDICATION", filed Apr. 4, 2018, which claims priority to International Patent Application No. PCT/CN2017/079563 to John Wilson et al., titled "MULTIPLE USER PORT LOADING INDICATION", filed Apr. 6, 2017, each of which is assigned to the assignee hereof, which is hereby incorporated by reference in its entirety.

BACKGROUND

The following relates generally to wireless communications, and more specifically to multiple user port loading indication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may communicate with multiple UEs simultaneously using multi-user (MU) multiple-input multiple-output (MIMO) communications. When communicating with multiple UEs, a base station may allocate one or more ports to each UE. Each port may be associated with a different reference signal sequence (e.g., a different demodulation reference signal (DMRS) pattern), which may be used for channel estimation. A UE, however, may not be informed of the number of ports assigned to other UEs in a given set of resources and may therefore blindly decode or perform channel estimation for all possible ports. This process may increase complexity at the UE, which may lead to latency and other performance issues.

SUMMARY

In multi-user (MU) multiple-input multiple-output (MIMO) wireless communications systems, a base station may communicate with multiple user equipments (UEs) concurrently using one or more ports. The base station may perform signaling to indicate information related to the ports assigned to a UE. The base station may also signal to the UE information regarding ports shared with other UEs. The UE may use the signaled information regarding other scheduled UEs when performing channel estimation. In some examples, the base station may signal to the UE a number of ports used per sub-band or a number of demodulation reference signal (DMRS) ports used by the UE. The base station may additionally or alternatively signal a subset of a total number of ports that are shared by other UEs overlapping with the physical downlink shared channel (PDSCH) allocation of the UE. The UE may determine a second subset of ports that are not shared by other UEs using the signaled information. The signaling may indicate whether code division multiplexing (CDM) is used on ports allocated for the UE or a number of combs used by the base station in the resource allocation for the UE. Such signaling may be communicated via downlink control information (DC), a media access control (MAC) control element (CE), a radio resource control (RRC) channel, or any combination thereof.

A method of wireless communications at a UE is described. The method may include communicating with a base station via MU-MIMO, the base station including a total number of ports available for MU-MIMO, receiving, from the base station, signaling indicative of a subset of the total number of ports, the subset including ports shared by other UEs having resource allocations that overlap with a resource allocation of the UE, and determining the subset based on the signaling.

An apparatus for wireless communications at a UE is described. The apparatus may include a processor, memory in electronic communication with the processor, and instructions stored in the memory. The instructions may be executable by the processor to cause the apparatus to communicating with a base station via MU-MIMO, the base station including a total number of ports available for MU-MIMO, receiving, from the base station, signaling indicative of a subset of the total number of ports, the subset including ports shared by other UEs having resource allocations that overlap with a resource allocation of the UE, and determining the subset based on the signaling.

Another apparatus for wireless communications at a UE is described. The apparatus may include communicating with a base station via MU-MIMO, the base station including a total number of ports available for MU-MIMO, receiving, from the base station, signaling indicative of a subset of the total number of ports, the subset including ports shared by other UEs having resource allocations that overlap with a resource allocation of the UE, and determining the subset based on the signaling.

A non-transitory computer-readable medium storing code for wireless communications at a UE is described. The code may include instructions executable by a processor to communicating with a base station via MU-MIMO, the base station including a total number of ports available for MU-MIMO, receiving, from the base station, signaling indicative of a subset of the total number of ports, the subset including ports shared by other UEs having resource allocations that overlap with a resource allocation of the UE, and determining the subset based on the signaling.

Some examples of the method, apparatuses, and non-transitory computer-readable medium described herein may further include operations, features, means, or instructions for determining a second subset of the total number of ports based on the signaling indicative of the subset, the second subset including ports not shared by other UEs.

In some examples of the method, apparatuses, and non-transitory computer-readable medium described herein, receiving the signaling indicative of the subset may include operations, features, means, or instructions for identifying an absence of multiplexed CDM ports among one or more ports allocated to the UE.

In some examples of the method, apparatuses, and non-transitory computer-readable medium described herein, receiving the signaling indicative of the subset may include operations, features, means, or instructions for identifying a number of combs to be used by the base station in the resource allocation of the UE, where each comb includes a pattern of resource elements.

Some examples of the method, apparatuses, and non-transitory computer-readable medium described herein may further include operations, features, means, or instructions for identifying which of the number of combs to be used by the base station may be to be used by the UE.

In some examples of the method, apparatuses, and non-transitory computer-readable medium described herein, receiving the signaling indicative of the subset may include operations, features, means, or instructions for identifying one or more groupings of the total number of ports and identifying at least one of the one or more groupings that includes the ports shared by the other UEs.

In some examples of the method, apparatuses, and non-transitory computer-readable medium described herein, identifying one or more groupings of the total number of ports may include operations, features, means, or instructions for receiving an identification of the one or more groupings via a RRC channel, a MAC CE, or any combination thereof.

In some examples of the method, apparatuses, and non-transitory computer-readable medium described herein, identifying at least one of the one or more groupings that may include operations, features, means, or instructions for receiving a bitmap indicating the at least one of the one or more groupings.

In some examples of the method, apparatuses, and non-transitory computer-readable medium described herein, the bitmap indicates the at least one of the one or more groupings without indicating groups that include ports assigned for use by the UE.

Some examples of the method, apparatuses, and non-transitory computer-readable medium described herein may further include operations, features, means, or instructions for receiving a list indicator identifying which of the separate lists includes the at least one of the one or more groupings.

In some examples of the method, apparatuses, and non-transitory computer-readable medium described herein, the bitmap corresponds to at least one of the one or more groupings in a look up table.

Some examples of the method, apparatuses, and non-transitory computer-readable medium described herein may further include operations, features, means, or instructions for receiving a port indication indicating one or more ports to be used by the UE and determining that the one or more groupings that include the one or more ports to be used by the UE include the ports shared by the other UEs.

In some examples of the method, apparatuses, and non-transitory computer-readable medium described herein, the signaling includes a RRC channel, DCI, a MAC control element (CE), or any combination thereof.

Some examples of the method, apparatuses, and non-transitory computer-readable medium described herein may further include operations, features, means, or instructions for performing a channel estimation process based on the subset.

In some examples of the method, apparatuses, and non-transitory computer-readable medium described herein, the signaling may be indicative of subsets of ports for respective sub-bands of a radio frequency spectrum band.

In some examples of the method, apparatuses, and non-transitory computer-readable medium described herein, the signaling includes a downlink grant.

A method of wireless communications is described. The method may include communicating with a UE via MU-MIMO, the base station including a total number of ports available for MU-MIMO and transmitting, to the UE, signaling indicative of a subset of the total number of ports, the subset including ports shared by other UEs having resource allocations that overlap with a resource allocation of the UE.

An apparatus for wireless communications is described. The apparatus may include a processor, memory in electronic communication with the processor, and instructions stored in the memory. The instructions may be executable by the processor to cause the apparatus to communicating with a UE via MU-MIMO, the base station including a total number of ports available for MU-MIMO and transmitting, to the UE, signaling indicative of a subset of the total number of ports, the subset including ports shared by other UEs having resource allocations that overlap with a resource allocation of the UE.

Another apparatus for wireless communications is described. The apparatus may include communicating with a UE via MU-MIMO, the base station including a total number of ports available for MU-MIMO and transmitting, to the UE, signaling indicative of a subset of the total number of ports, the subset including ports shared by other UEs having resource allocations that overlap with a resource allocation of the UE.

A non-transitory computer-readable medium storing code for wireless communications is described. The code may include instructions executable by a processor to communicating with a UE via MU-MIMO, the base station including a total number of ports available for MU-MIMO and transmitting, to the UE, signaling indicative of a subset of the total number of ports, the subset including ports shared by other UEs having resource allocations that overlap with a resource allocation of the UE.

In some examples of the method, apparatuses, and non-transitory computer-readable medium described herein, transmitting the signaling indicative of the subset may include operations, features, means, or instructions for indicating, to the UE, a second subset of the total number of ports based on the signaling indicative of the subset, the second subset including ports not shared by other UEs.

In some examples of the method, apparatuses, and non-transitory computer-readable medium described herein, transmitting the signaling indicative of the subset may include operations, features, means, or instructions for indicating, to the UE, an absence of multiplexed CDM ports among one or more ports allocated to the UE.

In some examples of the method, apparatuses, and non-transitory computer-readable medium described herein, transmitting the signaling indicative of the subset may include operations, features, means, or instructions for indicating, to the UE, a number of combs to be used by the base station in the resource allocation of the UE.

Some examples of the method, apparatuses, and non-transitory computer-readable medium described herein may further include operations, features, means, or instructions for indicating which of the number of combs to be used by the base station may be to be used by the UE.

In some examples of the method, apparatuses, and non-transitory computer-readable medium described herein, transmitting the signaling indicative of the subset may include operations, features, means, or instructions for identifying, to the UE, one or more groupings of the total number of ports and indicating at least one of the one or more groupings that includes the ports shared by the other UEs.

In some examples of the method, apparatuses, and non-transitory computer-readable medium described herein, identifying one or more groupings of the total number of ports may include operations, features, means, or instructions for transmitting an identification of the one or more groupings via a RRC channel, a MAC CE, or any combination thereof.

In some examples of the method, apparatuses, and non-transitory computer-readable medium described herein, indicating at least one of the one or more groupings that may include operations, features, means, or instructions for transmitting a bitmap indicating the at least one of the one or more groupings.

In some examples of the method, apparatuses, and non-transitory computer-readable medium described herein, the bitmap indicates the at least one of the one or more groupings without indicating groups that include ports assigned for use by the UE.

Some examples of the method, apparatuses, and non-transitory computer-readable medium described herein may further include operations, features, means, or instructions for transmitting a list indicator identifying which of the separate lists includes the at least one of the one or more groupings.

Some examples of the method, apparatuses, and non-transitory computer-readable medium described herein may further include operations, features, means, or instructions for transmitting a port indication indicating one or more ports to be used by the UE.

In some examples of the method, apparatuses, and non-transitory computer-readable medium described herein, the signaling may be a RRC channel, DCI, a MAC CE, or any combination thereof.

In some examples of the method, apparatuses, and non-transitory computer-readable medium described herein, the signaling may be indicative of subsets of ports for respective sub-bands of a radio frequency spectrum band.

In some examples of the method, apparatuses, and non-transitory computer-readable medium described herein, the signaling includes a downlink grant.

DETAILED DESCRIPTION

Figure 1:
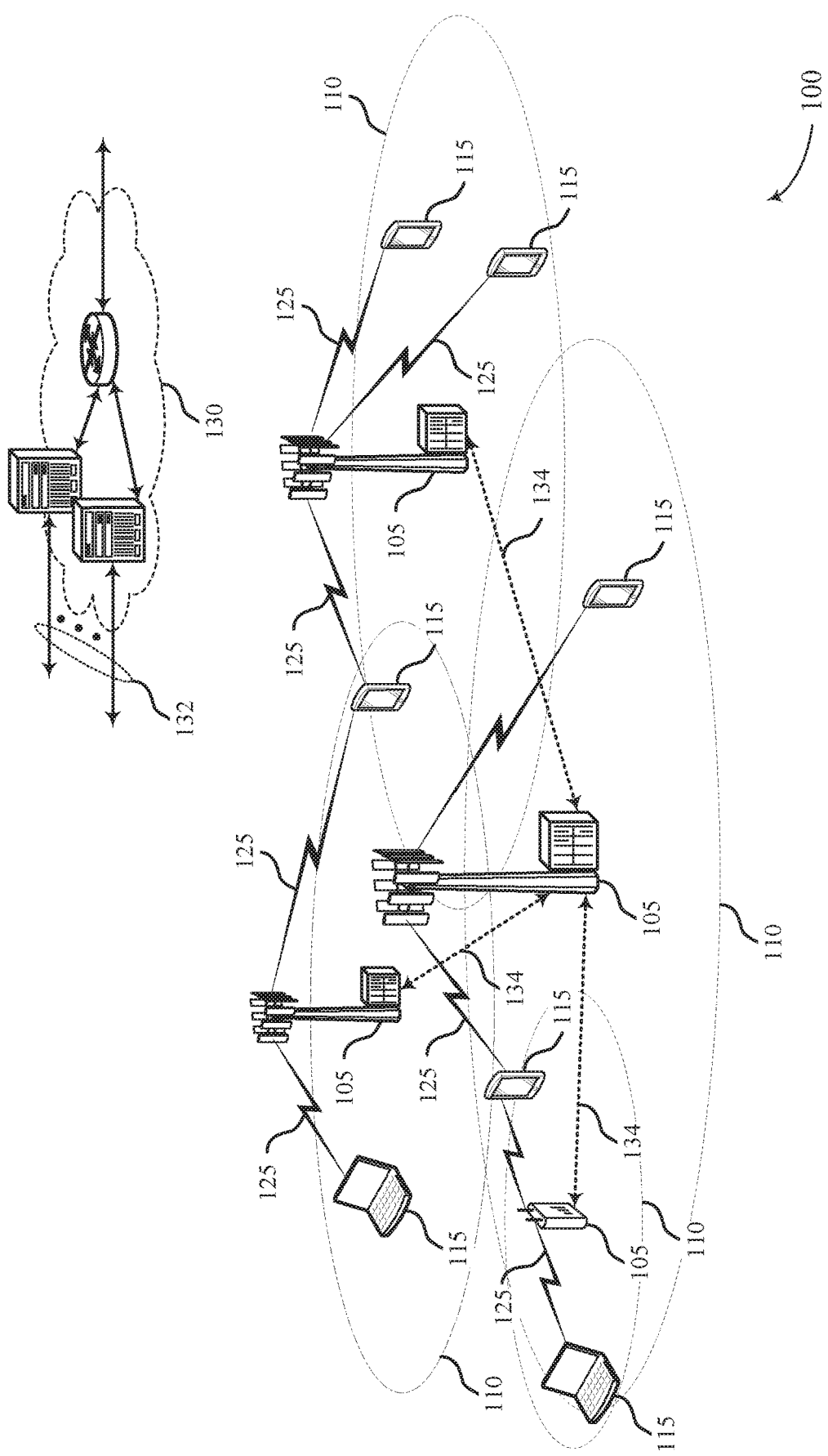
FIG. 1 illustrates an example of a wireless communications system that supports use of a multiple user port loading indication in accordance with aspects of the present disclosure.

A base station may communicate with multiple user equipments (UEs) simultaneously using multi-user (MU) multiple-input multiple-output (MIMO) communication techniques. The base station may be configured to use multiple antenna ports for MU-MIMO communication with various UEs. For example, a base station may use a first antenna port for communications with a first UE and a second UE, and the base station may use a second antenna port for communication with a third UE. In some cases, the first UE and second UE may be referred to as MU-MIMO paired devices and knowing which ports are assigned to a UE or shared by other UEs may help the UE perform channel estimation. For instance, the first UE and the second UE may be assigned overlapping resources, which may affect channel quality measurements at each UE.

The base station may signal port information to a UE, which the UE may use to determine port information of other scheduled UEs in a MU-MIMO communications environment. The signaling may include information that indicates a number of ports allocated to the UE and because the number of ports may vary for different sub-bands, the signaling may also provide information regarding port allocation on a per sub-band basis. A sub-band may refer to a single resource block (RB) or a set of multiple RBs, which may assigned to a UE. In some examples, the base station may signal a subset of a total number of ports supported by the base station, which may be available for use for the UE or within a particular sub-band. According to some aspects, the base station may perform signaling to the UE for each sub-band individually or for an entire sub-band. In one example, a first sub-band may include RBs 0 through 50 and a second sub-band may include RBs 51 through 100. The UE may be allocated RBs 0 through 25 and 57 through 75. A base station may signal to the UE a first bitmap indicating RBs 0 through 25 of the first sub-band. The base station may also signal a second bitmap indicating RBs 57 through 75 of the second sub-band. In another example, the sub-band may include RBs 0 through 100 and a single bitmap may be used to indicate RBs 0 through 25 and 57-75.

The base station may additionally or alternatively signal a number of demodulation reference signal (DMRS) ports to be used by the UE or a number of ports that are shared by other UEs overlapping with the physical downlink shared channel (PDSCH) allocation for the UE.

In some examples, to signal information related to the ports shared with other UEs, a base station may indicate whether code division multiplexing (CDM) is being used in a set of resources or may indicate a pattern of resources for use by the UE. The pattern of resources may be referred to as a comb and the base station may use signaling to inform the UE of the number of combs used by the base station or which combs are to be used by the UE. In some instances, a comb may be represented by an FDM spacing of K (e.g., 2, 3, 4, 7) such that a comb is allocated a set of REs within a sub-band that are spaced K REs apart. Such information may be transmitted from the base station in downlink control information (DCI), a media access control (MAC) control element (CE), or via radio resource control (RRC) signaling.

In some examples, a UE may determine which ports are shared based on the ports scheduled for the UE. A base station may schedule ports for a UE within a grouping of ports, and the UE may determine that other ports in the same grouping are likely to have MU-MIMO paired users. For example, the base station may configure the UE with two DMRS port groupings, where the first grouping includes a first set of ports, and the second grouping includes a second set of ports. If the UE gets assigned ports in the first grouping, the UE may determine that the second grouping does not have MU-MIMO paired UEs in the allocated resources. However, some of the ports in the first grouping may be shared and any remaining, unassigned ports may be used by other UEs scheduled in the resource allocation.

In other examples, the base station may dynamically signal a bitmap to indicate whether one or more ports are shared between multiple UEs. For instance, the UE may be configured with a list of DMRS port sets (e.g., via RRC signaling or a MAC CE) or one or more groupings of ports. A downlink grant or DCI may indicate assigned ports for the UE, which may be assigned based on the one or more groupings. A bitmap may be used to indicate a subset of the remaining groupings which may contain shared ports. Using the signaling information from the base station, a UE may determine the resources shared with other UEs. A UE may further determine resources that are not shared with other UEs. A UE may use the signaling information in order to perform accurate channel estimation or reduce total number of channel estimation measurements.

Aspects of the disclosure are initially described in the context of wireless communications systems. Aspects are then described with respect to a resource allocation and process flows. Aspects of the disclosure are further illustrated by and described with reference to apparatus diagrams, system diagrams, and flowcharts that relate to use of a multiple user port loading indication.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, S2). Base stations 105 may communicate with one another over backhaul links 134 (e.g., X1, X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a IE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some MIMO wireless systems, a base station 105 may communicate with multiple UEs 115 simultaneously. The base station 105 may allocate one or more antenna ports to each UE 115 and some of the antenna ports may be shared between multiple UEs. Based on the port allocation, the base station 105 may signal to a UE 115 information indicative of the allocated ports. Information related to ports shared with other UEs 115 and ports not shared with other UEs 115 may also be provided to the UE 115 (e.g., via signaling from the base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use Hybrid Automatic Repeat Request (HARQ) to provide retransmission at the MAC layer to improve link efficiency. In the control plane, the RRC protocol layer may provide establishment, configuration, and maintenance of an RRC connection between a UE 115 and base station 105 or core network 130 supporting radio bearers for user plane data. At the Physical layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
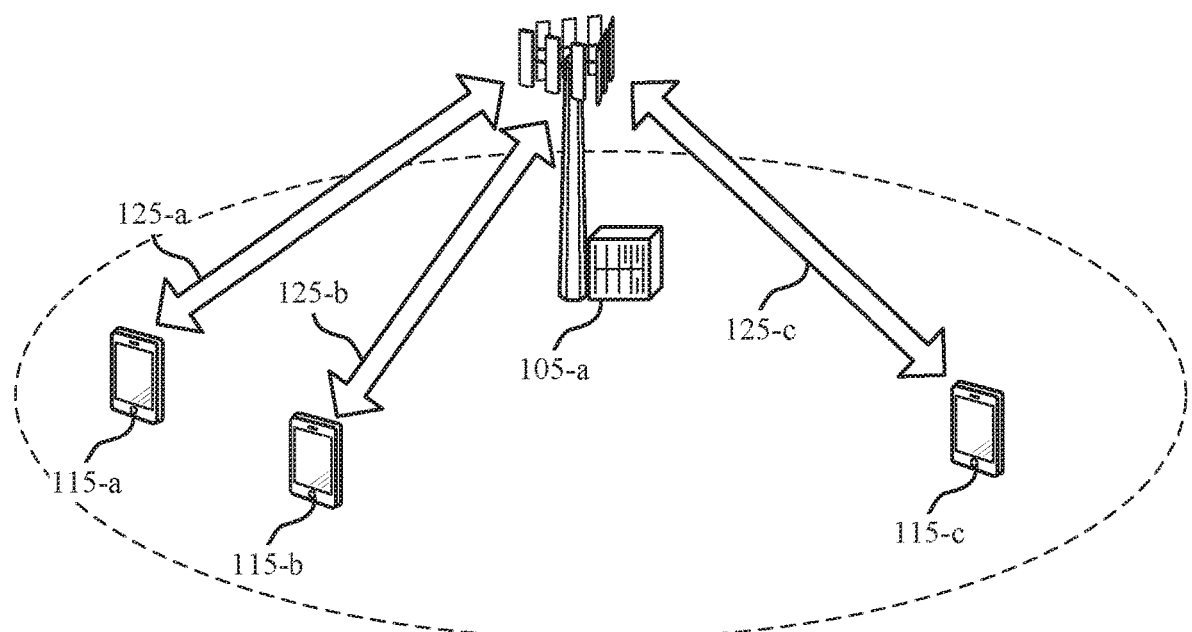
FIG. 2 illustrates an example of a wireless communications system that supports use of a multiple user port loading indication in accordance with aspects of the present disclosure.

FIG. 2 illustrates an example of a wireless communications system 200 that supports use of a multiple user port loading indication in accordance with various aspects of the present disclosure. In some examples, wireless communications system 200 may implement aspects of wireless communications system 100. Wireless communications system 200 may include UEs 115-a, 115-b, and 115-c, which may be examples of a UE 115 as described herein. Wireless communications system 200 may also include base station 105-a, which may be an example of a base station 105 as described herein.

Base station 105-a may communicate with multiple UEs 115 simultaneously using MU-MIMO communications. Base station 105-a may be configured to use different antenna ports for MU-MIMO communication with different UEs 115. For example, base station 105-a may use a first antenna port for communications with UE 115-a and UE 115-b by transmitting one or more reference signals via communication links 125-a and 125-b, respectively. Base station 105-a may use a second antenna port for communication with UE 115-c by transmitting one or more reference signals via communication link 125-c. In some cases, UE 115-a and UE 115-b may be referred to as MU-MIMO paired devices and knowing which ports are assigned to a UE 115 or shared by other UEs 115 may help a UE 115 perform channel estimation. For example, UE 115-a and UE 115-b may be assigned overlapping resources such that UE 115-a may be receiving one or more DMRSs via the overlapping resources and knowing the resources are shared by UE 115-b may help to perform accurate channel estimation.

In some examples, base station 105-a may signal port information to UE 115-a, which UE 115-a may use to determine port information of other scheduled UEs 115 (e.g., UE 115-b and UE 115-c) in MU-MIMO communications. UE 115-a may use the port information of other scheduled UEs 115 when performing channel estimation. In some examples, base station 105-a may signal a number of ports used per sub-band to UE 115-a or a number of DMRS ports used by UE 115-a. Base station 105-a may additionally or alternatively signal a subset of a total number of ports that are supported by the base station 105-a. The subset may include ports that are shared by other UEs 115 (e.g., UEs 115 that are allocated resources overlapping with the PDSCH resource allocation of UE 115-a). In some examples, base station 105-a may signal whether multiple ports are multiplexed in a resource element (or set of resources). For instance, base station 105-a may indicate whether multiple ports are multiplexed according to a CDM scheme and which ports are allocated to UE 115-a. Additionally or alternatively, base station 105-a may signal a pattern of resources allocated for reference signals for UE 115-a. The pattern of resources may be referred to as a comb and base station 105-a may signal to UE 115-a the number of combs and which combs are to be used by UE 115-a. The signaling of the ports allocated for UE 115-a and shared with other UEs 115 may be signaled in DCI, a MAC CE, or via an RRC channel.

In some examples, UE 115-a may determine which ports are shared based on the ports scheduled to UE 115-a. For instance, base station 105-a may schedule one or more ports within a grouping of ports to UE 115-a. Based on the grouping, UE 115-a may determine that other ports in the same grouping are likely to have MU-MIMO paired users. In one example, base station 105-a may configure UE 115-a with two DMRS port groupings. The first grouping may include ports 1, 2, 3, and 4, and the second grouping includes ports 5, 6, 7, and 8. If UE 115-a gets assigned ports 1 and 2, UE 115-a may determine that the second grouping (ports 5, 6, 7, and 8) do not have MU-MIMO paired UEs 115. However, some of the resource elements may be used by other ports in the first grouping (e.g., some UEs 115 may be sharing ports 3 and 4 of the first grouping).

In some examples, the base station 105-a may configure a table of bitmaps and corresponding groupings of ports. For instance, as shown in Table 1 below, bitmap 000 corresponds to {1, 2, 3, 4, 5}, bitmap 001 corresponds to {3, 4, 8}, and bitmap 010 corresponds to {5, 6, 7, 8}. The base station 105-a may signal the ports allocated to UE 115-a and a bitmap. For example, the base station 105-a may signal allocated ports {1, 2} to UE 115-a and bitmap 010. In one example, the UE 115-a may determine that the shared ports are the union of the grouping containing the allocated ports (i.e., {1, 2, 3, 4, 5}) and the grouping indicated by the bitmap (i.e., {5, 6, 7, 8}) which is {1, 2, 3, 4, 5, 6, 7, 8}. In another implementation, the UE 115-a may determine that the shared ports are the union of the allocated ports (i.e., {1, 2} and the grouping indicated by the bitmap (i.e., {5, 6, 7, 8}), which is {1, 2, 5, 6, 7, 8}.

TABLE 1

| Bitmap | Grouping |
| --- | --- |
| 000 | (1, 2, 3, 4, 5) |
| 001 | {3, 4, 8} |
| 010 | {5, 6, 7, 8} |

In some examples, one port may be included in multiple groupings. Base station 105-a may use a bitmap to indicate which of the groupings contains one or more MU-MIMO ports shared with UE 115-a. For example, a first grouping may include ports 1, 2, and 3, a second grouping may include ports 5, 6, and 7, and a third grouping may include ports 1, 5, and 8. UE 115-*a* may be assigned port 1, which may be included in both the first grouping and the third grouping. Base station 105-*a* may indicate a bitmap of '100' to UE 115-*a* which informs the UE 115-*a* that the first grouping includes shared MU-MIMO ports. Additionally or alternatively, if the third grouping includes MU-MIMO ports, the indicated bitmap may be '001.' In another example, if both groupings include MU-MIMO ports, the indicated bitmap may be '101.'

In other examples, base station 105-*a* may dynamically signal a bitmap to indicate if one or more ports are allocated to other UEs 115. For instance, UE 115-*a* may be configured with a list of DMRS port sets through RRC signaling or via a MAC CE. In one case, UE 115-*a* may be configured with DMRS groupings such that a first grouping includes ports 0, 1, and 2, a second grouping includes ports 3, 4, and 5, a third grouping includes 6, 7, and 8, and a fourth grouping includes ports 9, 10, and 11. A downlink grant (e.g., transmitted by base station 105-*a*) may indicate assigned ports for UE 115-*a*. UE 115-*a* may be assigned ports 0 and 1 and a bitmap may be used to indicate which of the groupings, excluding the first group (i.e., the group having ports already assigned to UE 115-*a*), contain shared ports. In one example, a bitmap may be '010' to indicate that the third grouping includes at least one port which is shared by other UEs 115. In such cases, base station 105-*a* may use a 3-bit bitmap to indicate the grouping of the four groupings because UE 115-*a* may already have determined that the first grouping, which includes ports scheduled for UE 115-*a*, includes shared ports based on the scheduling.

In some examples, UE 115-*a* may be configured with one or more lists of ports. For example, a first list may include three groupings. A first grouping may include ports 0, 1, 2, and 3, a second grouping may include ports 4, 5, 6, and 7, and a third grouping may include ports 8, 9, 10, and 11. UE 115-*a* may be configured with another list including a second set of port groupings. For example, the second list may include a first grouping of ports 0 and 1, a second grouping of ports 2 and 3, a third grouping of 4 and 5, a fourth group of 6 and 7, a fifth grouping of 8 and 9, and a sixth grouping of 10 and 11. Base station 105-*a* may transmit a downlink grant including assigned ports for UE 115-*a*. In some examples, the downlink grant may include a one-bit list indicator to select the first list, which may include ports assigned to or scheduled for UE 115-*a*. The downlink grant may also include a bitmap, which may indicate which groupings of the first list include shared ports.

Figure 3:
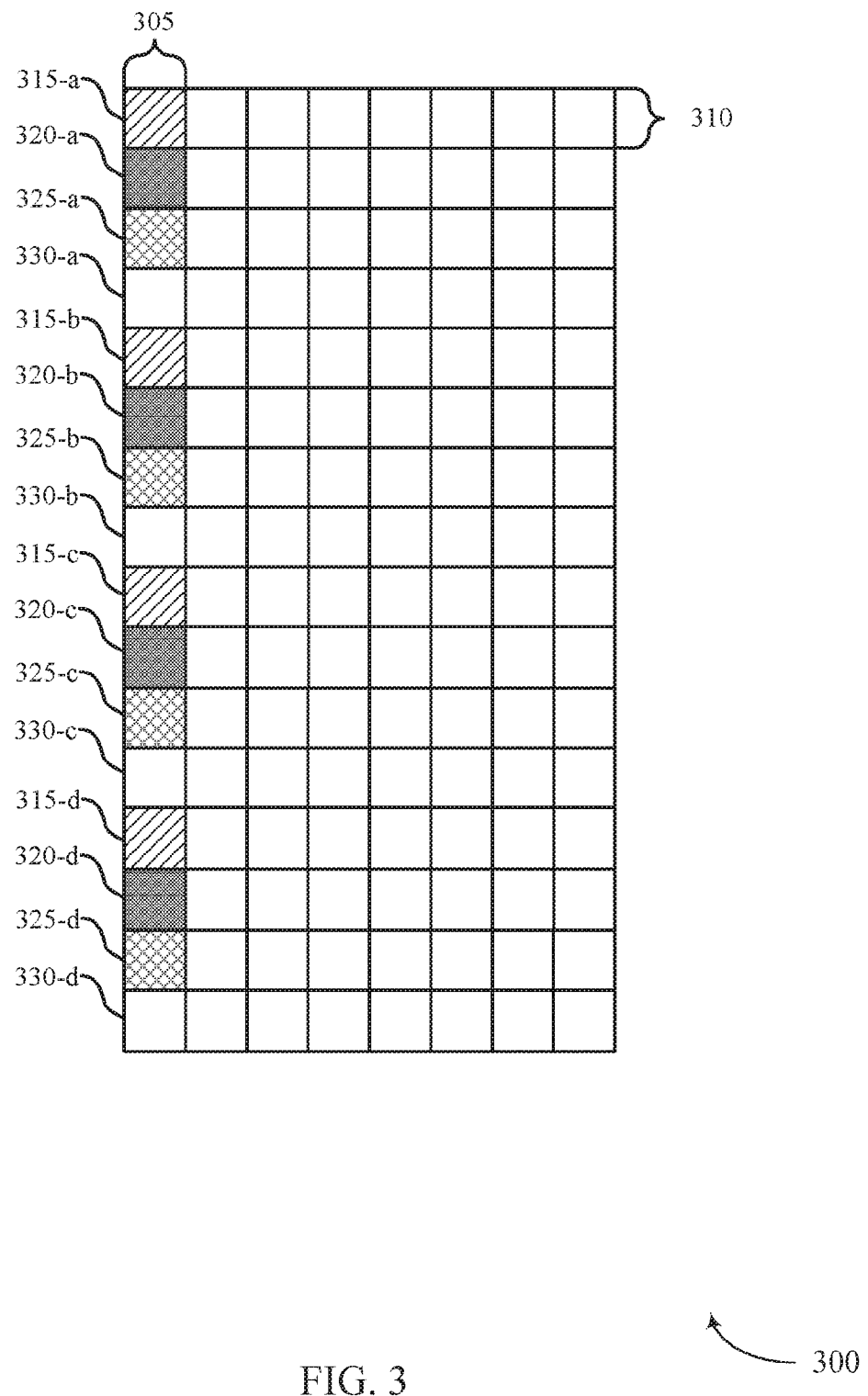
FIG. 3 illustrates an example of a multi-user (MU) multiple-input multiple-output (MIMO) resource allocation that supports use of a multiple user port loading indication in accordance with aspects of the present disclosure.

FIG. 3 illustrates an example of a MU-MIMO resource allocation 300 that supports the use of a multiple user port loading indication in accordance with various aspects of the present disclosure. In some examples, MU-MIMO resource allocation 300 may implement aspects of wireless communications systems 100 or 200 as described above with reference to FIGS. 1 and 2. A base station 105 may allocate resources to a UE 115 and transmit to the UE 115 using a number of ports using MU-MIMO. In some examples, the base station 105 may communicate with multiple UEs 115 in the same resource allocation as the UE 115. The base station 105 may indicate which ports are assigned to the UE 115 as well as any ports in the resource allocation shared with other UEs 115.

A base station 105 may allocate a resource element to a first UE 115. Resource elements may span the time of a symbol period 305 over the bandwidth of a tone 310. The base station 105 may allocate resources and transmit information to the first UE 115 over a number of tones 310. The base station 105 may transmit information in a resource element using one or more ports. In some examples, the base station 105 may rotate the port used for communication across multiple tones 310 based on a pattern of resources (i.e., a comb). For example, the MU-MIMO resource allocation 300 may illustrate four combs 315, 320, 325, and 330, each comb including a set of resource elements and repeated over a given bandwidth. A first comb may include resource elements 315-*a*, 315-*b*, 315-*c*, and 315-*d*. The second comb may include resource elements 320-*a*, 320-*b*, 320-*c*, and 320-*d*, the third comb may include resource elements 325-*a*, 325-*b*, 325-*c*, and 325-*d*, and the fourth comb may include resource elements 330-*a*, 330-*b*, 330-*c*, and 330-*d*. In some examples, a base station may allocate a comb, such as comb 315, to a UE 115 and may indicate the number of combs used or the allocated comb to the UE (e.g., via RRC signaling).

The base station 105 may use port 7, port 8, and port 9 to transmit DMRS to the first UE 115 in combs 315, 320, and 325. For instance, base station 105 may utilize port 7 to transmit DMRS in comb 315, port 8 to transmit DMRS in comb 320, and port 9 to transmit DMRS in comb 325. Resource elements 330 may not be scheduled for DMRS transmission and in some cases may be used by a UE 115 for data transmission. That is, one or more UEs 115 may receive a DMRS from port 7 in comb 315, a DMRS from port 8 in comb 320, and a DMRS from port 9 in comb 325. Comb 330, however, may not be scheduled for DMRS and the resource elements of comb 330 may utilized for other transmission (e.g., data).

The base station 105 may indicate the ports assigned to the first UE 115 and may also indicate the ports shared with other UEs 115, which may assist the first UE 115 in channel estimation as the first UE 115 may refrain from performing blind decoding or channel estimation for the other possible but unassigned ports.

In some examples, the base station 105 may indicate the comb configuration to the UE 115. For example, the base station 105 may indicate the number of combs to the first UE 115 or a comb pattern. The comb pattern may refer to an allocation of REs for a given symbol. The REs in the comb pattern may be spaced apart by K REs within a sub-band. As shown in FIG. 3, for example, each of combs 315, 320, and 325 include a set of REs that are spaced apart by K=4 REs. Thus, a maximum of 4 combs may be utilized, each comb allocated REs within a sub-band that are spaced apart by 4 REs. If the first UE 115 is allocated ports 7 and 8, the base station 105 may indicate that the first three combs (e.g., combs 315, 320, and 325) are utilized. Based on the indication, the first UE 115 may rate match around the first three combs when utilizing the comb 330 for data communications.

In some examples, the base station 105 may be configured for MU-MIMO transmission. The base station 105 may multiplex transmission for two UEs 115 using a shared port. For example, the base station 105 may transmit a DMRS to the first UE 115 using resource element 315-*a* and transmit a DMRS to a second UE 115 using resource element 315-*b* (e.g., in the same comb as resource element 315-*a*). For example, the base station 105 may transmit a DMRS to the first UE 115 using port 7 in resource element 315-*a* and 315-*c*, and the base station may transmit the DMRS to the second UE 115 using port 7 in resource element 315-*b* and 315-*d*. Thus, base station 105 may transmit DMRS in the resource elements 315 by sharing port 7 between the first UE 115 and the second UE 115.

If a UE 115 is allocated ports shared with other UEs 115, the base station 105 may indicate the shared ports to the UE

115. Knowing the shared ports may assist the UE 115 with channel estimation. For example, port 7 may be shared between the first UE 115 and the second UE 115 as described above. If the first UE 115 receives DMRS in resource elements 315-*a* and 315-*c*, the first UE may refrain from performing channel estimation on resource elements 315-*b* and 315-*d*.

In some examples, the base station 105 may be configured for CDM transmission. For example, the base station 105 may transmit using both port 7 and port 11 on resource element 315-*a*. The base station may indicate to the first UE 115 whether there is CDM with ports assigned to the first UE 115. In some examples, indicating whether there is CDM on the assigned ports may assist the first UE 115 with channel estimation.

Figure 4:
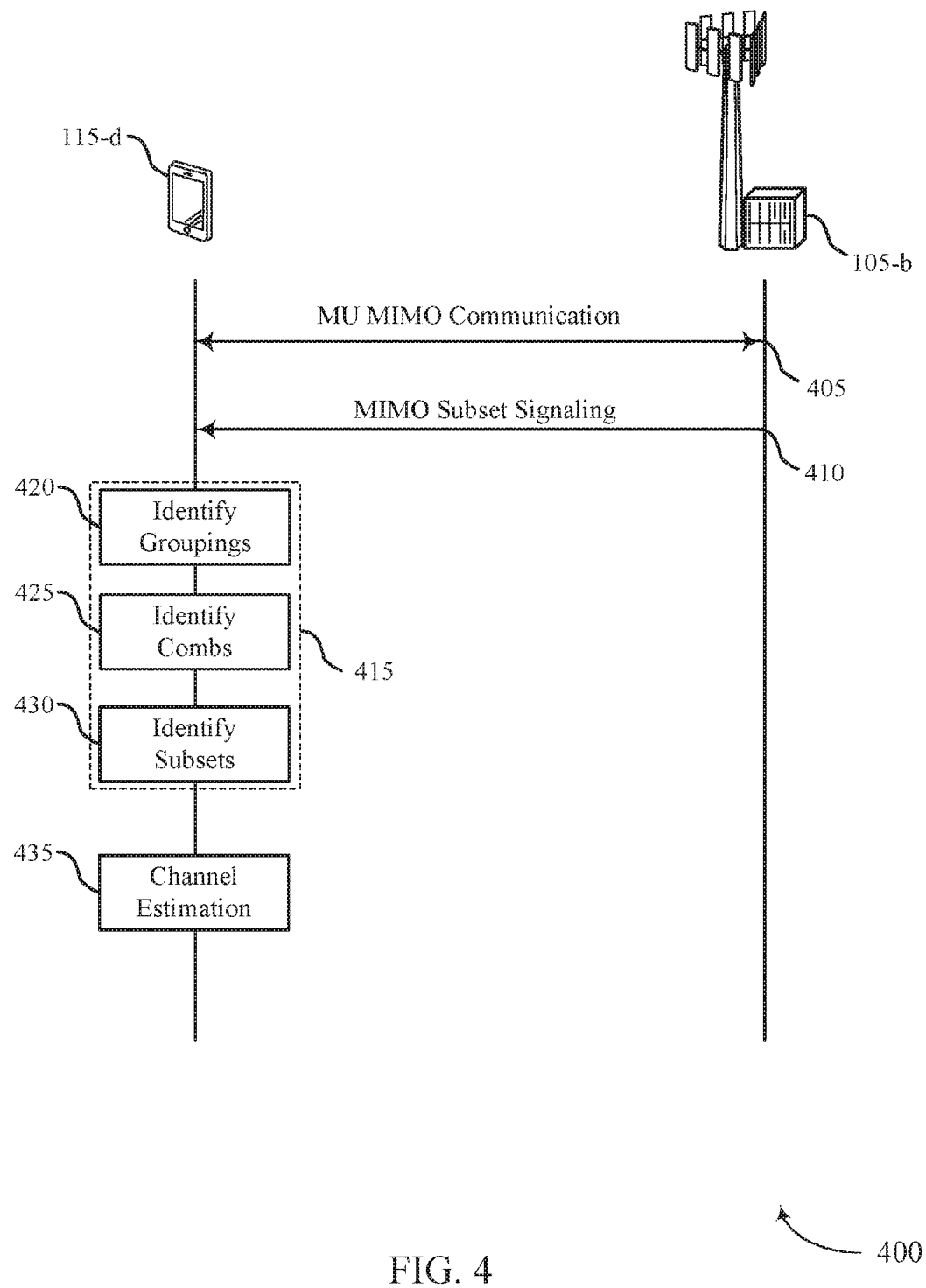
FIG. 4 illustrates an example of a process flow that supports use of a multiple user port loading indication in accordance with aspects of the present disclosure.

FIG. 4 illustrates an example of a process flow 400 that supports the use of a multiple user port loading indication in accordance with various aspects of the present disclosure. In some examples, process flow 400 may implement aspects of wireless communications system 100. Process flow 400 may include UE 115-*d* and base station 105-*b*, which may be respective examples of a UE 115 and base station 105 as described herein.

At 405, UE 115-*d* and base station 105-*b* may communicate via MU-MIMO. In some examples, base station 105-*b* may include a total number of ports available for MU-MIMO.

At 410, base station 105-*b* may transmit MIMO subset signaling to UE 115-*d*. Base station 105-*b* may transmit signaling indicative of a subset of the total number of ports, the subset including ports shared by other UEs 115 having resource allocations that overlap with a resource allocation of UE 115-*d*. In some examples, the signaling may be performed via an RRC channel, DCI, a MAC CE, or any combination thereof. In some examples, receiving the signaling indicative of the subset may include identifying an absence of multiplexed CDM ports among one or more ports allocated to UE 115-*d*.

At 415, UE 115-*d* may use the MIMO subset signaling to determine assigned ports as well as ports shared with other UEs 115. At 420, UE 115-*d* may identify one or more groupings of the total number of ports. UE 115-*d* may identify at least one of the one or more groupings that includes ports shared by other UEs 115. In some examples, UE 115-*d* may receive an identification of groupings of the total number of ports by an RRC channel, a MAC CE, or any combination thereof.

In some examples, identifying one of the one or more groupings that includes ports shared by other UEs includes receiving a bitmap indicating the at least one of the one or more groupings. In some examples, the bitmap may indicate the at least one of the one or more groupings without indicating groups that include ports assigned for use by UE 115-*d*. In some examples, the one or more groupings may be organized into separate lists, and UE 115-*d* may receive a list indicator identifying which of the separate lists includes the at least one of the one or more groupings.

In some examples, UE 115-*d* may receive a port indication indicating one or more ports to be used by UE 115-*d*, and UE 115-*d* may determine that the one or more groupings that includes the one or more ports to be used by UE 115-*d* include the ports shared by the other UEs.

At 425, UE 115-*d* may identify combs assigned within a set of resources for UE 115-*d*. For example, UE 115-*d* may identify a number of combs to be used by base station 105-*b* in the resource allocation of UE 115-*d*. UE 115-*d* may identify which of the number of combs to be used by base station 105-*b* may be used by UE 115-*d*.

At 430, UE 115-*d* may identify subsets of the groupings which may include shared ports. In some examples, UE 115-*d* may use the MIMO subset signaling to determine a second subset of ports that are not shared by other UEs 115-*d*. At 435, UE 115-*d* may perform channel estimation based on the subset.

Figure 5:
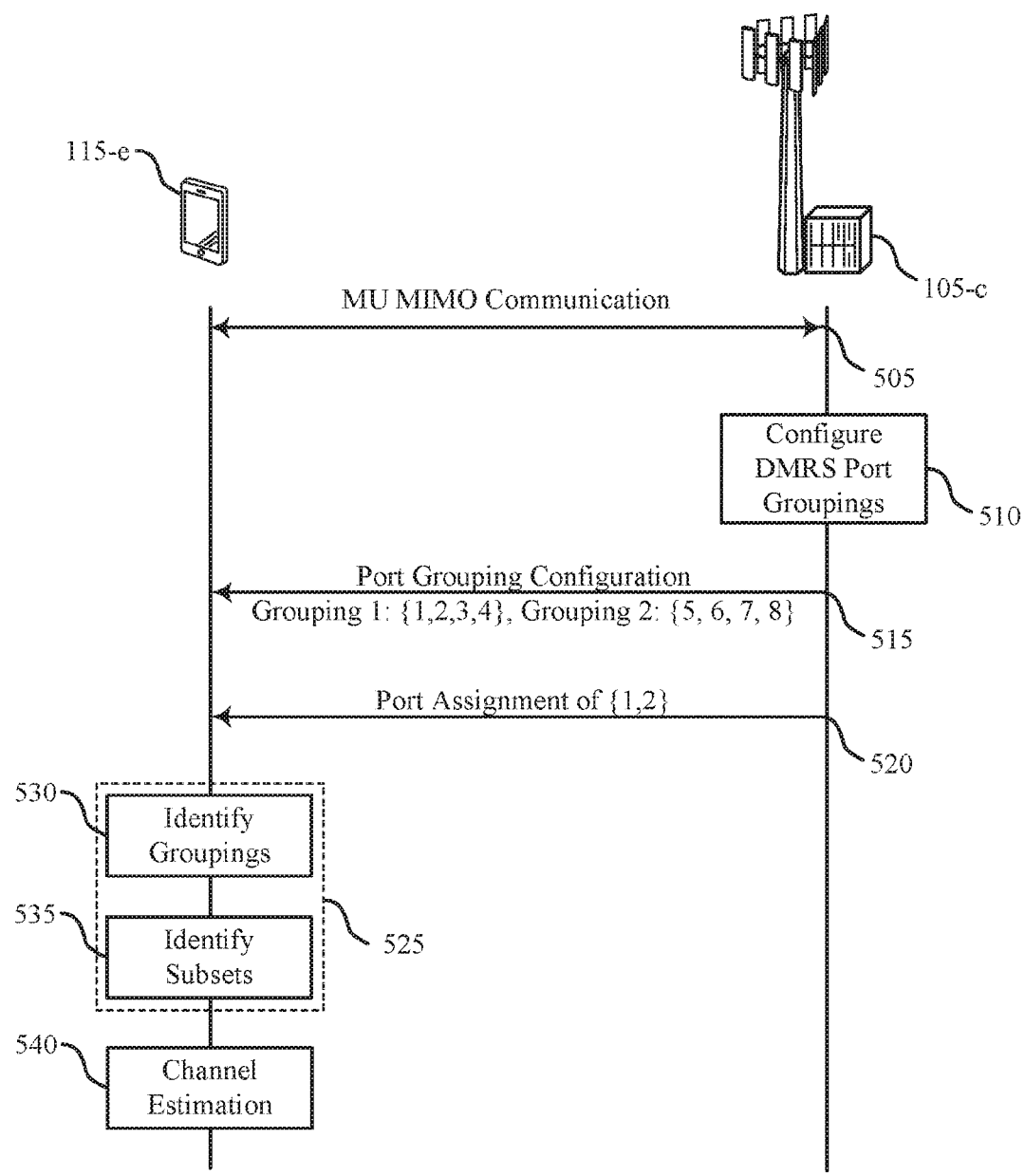
FIG. 5 illustrates an example of a process flow that supports use of a multiple user port loading indication in accordance with aspects of the present disclosure.

FIG. 5 illustrates an example of a process flow 500 that supports use of a multiple user port loading indication in accordance with various aspects of the present disclosure. In some examples, process flow 500 may implement aspects of wireless communications system 100. Process flow 500 may include UE 115-*e* and base station 105-*c*, which may be examples of a UE 115 and base station 105 as described herein.

At 505, UE 115-*e* and base station 105-*c* may communicate via MU-MIMO. In some examples, base station 105-*c* may include a total number of ports available for MU-MIMO. At 510, base station 105-*c* may configure DMRS port groupings for UE 115-*e*.

At 515, base station 105-*c* may configure UE 115-*e* with a port grouping configuration by transmitting the configuration to UE 115-*e*. For example, a first grouping may include ports 1, 2, 3, and 4, and a second grouping may include ports 5, 6, 7, and 8.

At 520, base station 105-*c* may indicate assigned ports to UE 115-*e*. For example, base station 105-*c* may assign ports 1 and 2 to UE 115-*e*. Base station 105-*c* may indicate the assigned ports by, for example, RRC signaling, DCI, a MAC CE, or a downlink grant.

At 525, UE 115-*e* may determine the assigned ports as well as ports shared by other UEs 115. For example, UE 115-*e* may identify the configured groupings at 530. Then, UE 115-*e* may identify the groupings that include shared ports. UE 115-*e* may determine the shared ports based on the assigned ports for UE 115-*e*. For example, UE 115-*e* may be assigned ports 1 and 2, which may be in the first grouping. UE 115-*e* may then determine whether shared ports are in the first grouping or in the second grouping. In some examples, UE 115-*e* may determine ports included in the second grouping may not be in the resources allocated for UE 115-*e*.

At 535, UE 115-*e* may identify subsets of the groupings which may include shared ports. In some examples, UE 115-*d* may determine a second subset of ports that are not shared by other UEs 115-*e*. At 540, UE 115-*e* may perform channel estimation based on the determined assigned ports and shared ports.

In other examples, UE 115-*e* may be assigned to a port which is in multiple groupings. For example, a first grouping may include ports 1, 2, 3, a second grouping may include ports 5, 6, and 7, and a third grouping may include ports 1, 5, and 8. UE 115-*e* may be assigned port 1, which may be in both the first grouping and the third grouping. Base station 105-*c* may transmit a bit indicator to assist UE 115-*e* with identifying which grouping should be considered as the grouping containing the MU-MIMO ports. For example, a DCI message may include a bitmap set to 100 to indicate that the first grouping (e.g., including ports 1, 2, and 3) include the MU-MIMO ports.

Figure 6:
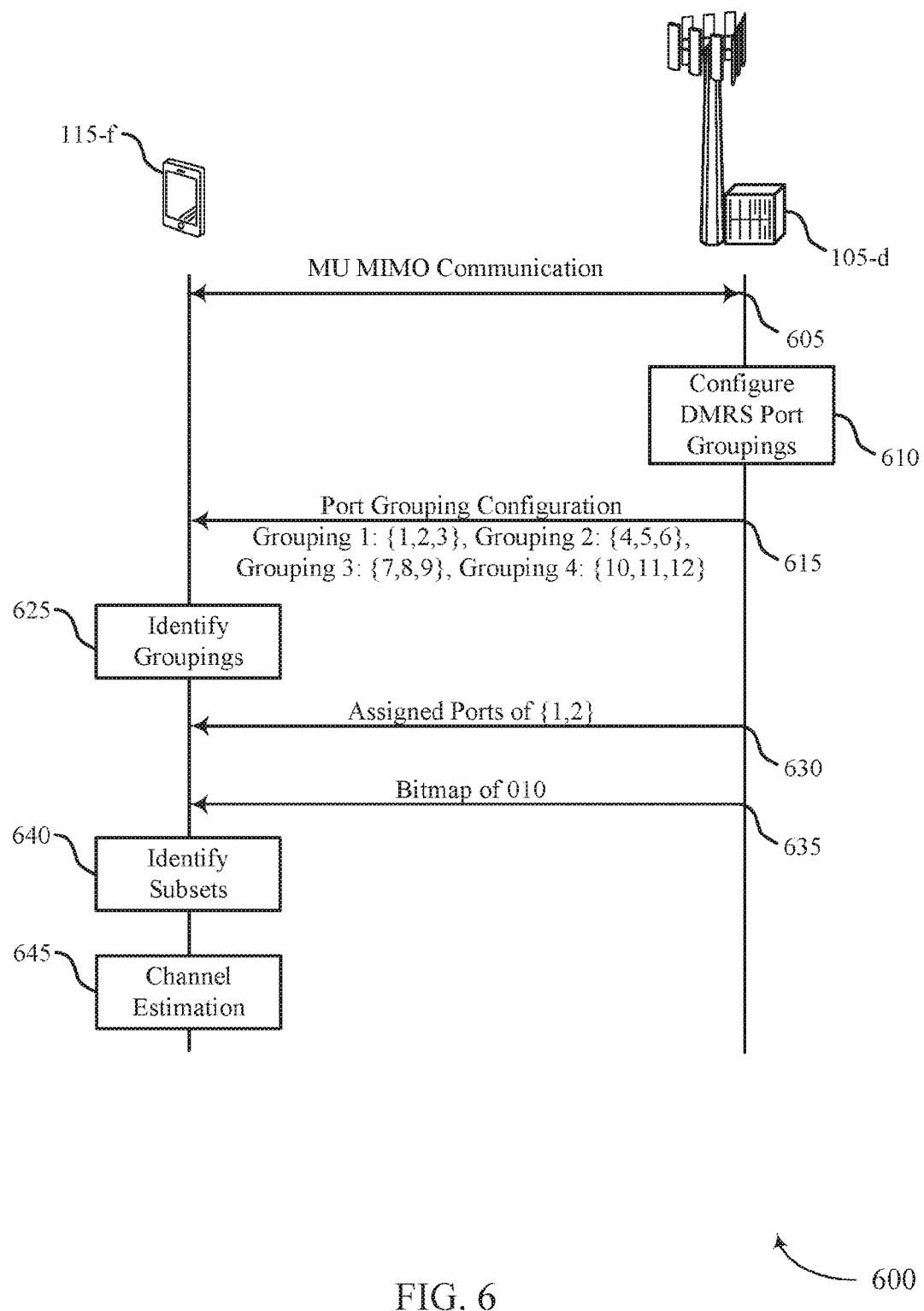
FIG. 6 illustrates an example of a process flow that supports use of a multiple user port loading indication in accordance with aspects of the present disclosure.

FIG. 6 illustrates an example of a process flow 600 that supports use of a multiple user port loading indication in accordance with various aspects of the present disclosure. In some examples, process flow 600 may implement aspects of wireless communications system 100. Process flow 600 may include UE 115-f and base station 105d. UE 115-f and base station 105-d may be examples of a UE 115 and base station 105 as described herein.

At 605, UE 115-f and base station 105-d may communicate via MU-MIMO. In some examples, base station 105-d may include a total number of ports available for MU-MIMO. At 610, base station 105-d may configure DMRS port groupings for UE 115-f.

At 615, base station 105-d may configure UE 115-f with a port grouping configuration by transmitting the configuration to UE 115-f. For example, a first grouping may include ports 1, 2, and 3, a second grouping may include ports 4, 5, and 6, a third grouping may include ports 7, 8, and 9, and a fourth grouping may include ports 10, 11, and 12. In some examples, base station 105-d may indicate the port grouping configuration via an RRC channel or MAC CE.

In some examples, base station 105-d may configure UE 115-f with two lists of groupings. The first list may include groupings of assigned ports for UE 115-f, and the second list may include groupings of ports that are used by other UEs 115. For example, a first list may include a first grouping including ports 1, 2, 3, and 4, a second grouping including ports 5, 6, 7, and 8, and a third grouping including ports 9, 10, 11, and 12.

At 625, UE 115-f may identify the groupings as configured based on the configuration transmitted from base station 105-d.

At 630, base station 105-d may transmit an indication of the assigned ports to UE 115-f. For example, base station 105-d may assign ports 1 and 2 to UE 115-f. Base station 105-d may indicate the assigned ports by, for example, RRC signaling, DCI, a MAC CE, or a downlink grant.

If UE 115-f is configured with the lists of groupings, base station 105-d may indicate one of the groupings of the first list to UE 115-f to indicate the assigned ports. For example, base station 105-d may indicate the first group to UE 115-f, such that UE 115-f may be assigned ports 1, 2, 3, and 4.

At 635, base station 105-d may then transmit a bitmap to UE 115-f. The bitmap may indicate other groupings with shared ports. For example, if at least one port in the third grouping (e.g., including ports 7, 8, and 9) is allocated to other UEs 115, the bitmap may indicate the third group. A bitmap of 010 may indicate the second and fourth groupings may not include shared ports (e.g., represented by 0s), but the third grouping may include shared ports (e.g., indicated by a 1). Because the first grouping is already assigned to UE 115-f, the base station may not represent the first grouping in the bit map and use a three bit bitmap for groupings 2, 3, and 4.

Table 2 below describes which groupings may be identified based on the bitmap. If there is an X in the corresponding column, the grouping may be identified as having MU-MIMO ports based on the bit indicator. If UE 115-f is assigned ports 1 and 2, then the first grouping is already known to include MU-MIMO ports. Thus, the first grouping may not be represented by a bit in the bitmap and the bitmap may indicate the grouping of remaining groupings (groupings 2, 3, and 4) that includes shared ports.

TABLE 2

| Bitmap | Grouping 2 | Grouping 3 | Grouping 4 |
|---|---|---|---|
| 000 | | | |
| 001 | | | X |
| 010 | | X | |
| 011 | | X | X |
| 100 | X | | |
| 101 | X | | X |
| 110 | X | X | |
| 111 | X | X | X |

For example, as shown in Table 2, bitmap 010 may be used to indicate that grouping 3 contains one or more ports that are shared with other UEs 115. In another example, bitmap 110 may be used to indicate that both groupings 2 and 3 include ports that are shared with other UEs. In some cases, the bitmap may be transmitted by base station 105-d to UE 115-f. For example, the bitmap may be contained within a downlink grant or DCI. Other examples of bitmaps and corresponding groupings may be considered without departing from the scope of the disclosure.

If UE 115-f is configured with the lists of groupings, base station 105-d may transmit a bitmap at 635 to indicate which groupings of the second list may include MU-MIMO ports. As described above, the bitmap may not represent groupings which include ports assigned to UE 115-f. For example, UE 115-f may be assigned ports 1, 2, 3, and 4. The second list may include six groupings. The first grouping may include ports 1 and 2, the second grouping may include ports 3 and 4, the third grouping may include 5 and 6, the fourth grouping may include ports 7 and 8, the fifth grouping may include ports 9 and 10, and the sixth grouping may include ports 11 and 12. If base station 105-d transmit a bitmap of 1101 to UE 115-f, that may indicate that groupings 3, 4, and 6 may include ports that are used by other UEs 115.

At 640, UE 115-f may identify subsets of the groupings which may include shared ports. UE 115-f may determine the shared ports based on the assigned ports and the bitmap. At 645, UE 115-f may perform channel estimation based on the assigned ports and shared ports.

Figure 7:
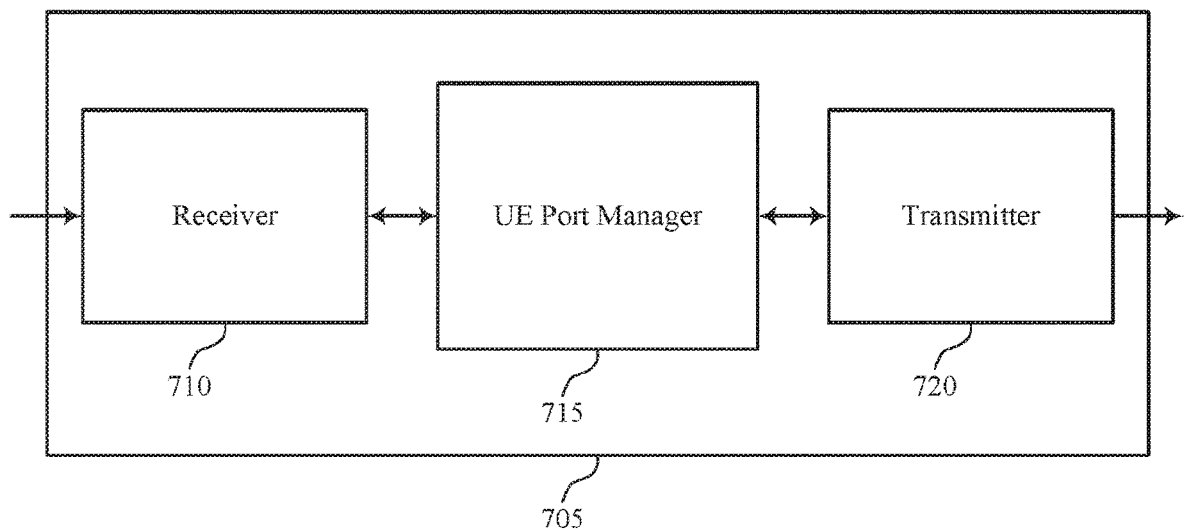
FIGS. 7 through 9 show block diagrams of a device that supports use of a multiple user port loading indication in accordance with aspects of the present disclosure.

FIG. 7 shows a block diagram 700 of a wireless device 705 that supports use of a multiple user port loading indication in accordance with aspects of the present disclosure. Wireless device 705 may be an example of aspects of a UE 115 as described herein. Wireless device 705 may include receiver 710, UE port manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to use of a multiple user port loading indication). Information may be passed on to other components of the device. The receiver 710 may be an example of aspects of the transceiver 1035 described with reference to FIG. 10. The receiver 710 may utilize a single antenna or a set of antennas.

UE port manager 715 may be an example of aspects of the UE port manager 1015 described with reference to FIG. 10. UE port manager 715 and/or at least some of its various sub-components may be implemented in hardware, software executed by a processor, firmware, or any combination thereof. If implemented in software executed by a processor, the functions of the UE port manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE port manager 715 and/or at least some of its various sub-components may be physically located at various positions, including being distributed such that portions of functions are implemented at different physical locations by one or more physical devices. In some examples, UE port manager 715 and/or at least some of its various sub-components may be a separate and distinct component in accordance with various aspects of the present disclosure. In other examples, UE port manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE port manager 715 may communicate with a base station via MU-MIMO, the base station including a total number of ports available for MU-MIMO, receive, from the base station, signaling indicative of a subset of the total number of ports, the subset including ports shared by other UEs having resource allocations that overlap with a resource allocation of the UE, and determine the subset based on the signaling.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
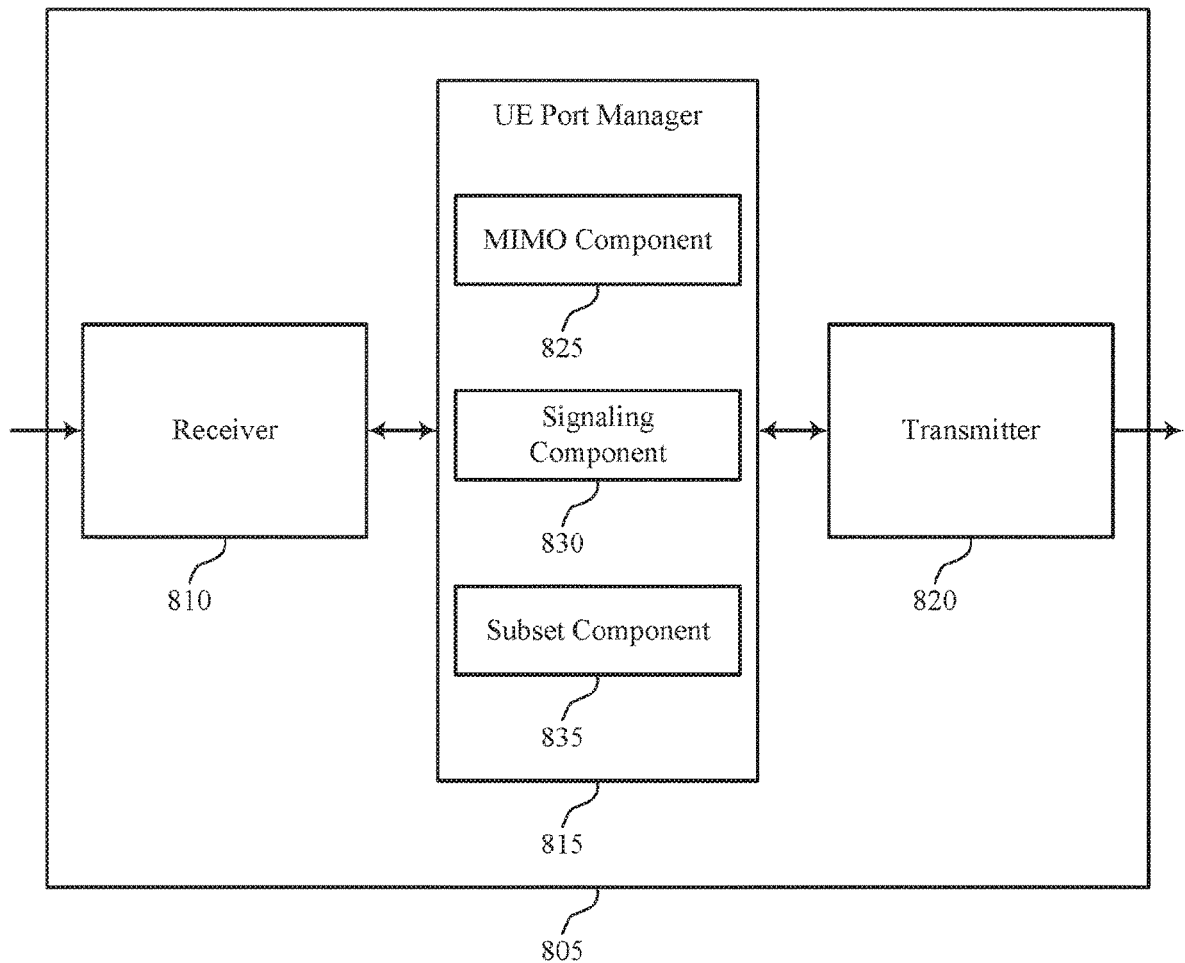

FIG. 8 shows a block diagram 800 of a wireless device 805 that supports use of a multiple user port loading indication in accordance with aspects of the present disclosure. Wireless device 805 may be an example of aspects of a wireless device 705 or a UE 115 as described with reference to FIG. 7. Wireless device 805 may include receiver 810, UE port manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to use of a multiple user port loading indication). Information may be passed on to other components of the device. The receiver 810 may be an example of aspects of the transceiver 1035 described with reference to FIG. 10. The receiver 810 may utilize a single antenna or a set of antennas.

UE port manager 815 may be an example of aspects of the UE port manager 1015 described with reference to FIG. 10.

UE port manager 815 may also include MIMO component 825, signaling component 830, and subset component 835.

MIMO component 825 may communicate with a base station via MU-MIMO, the base station including a total number of ports available for MU-MIMO.

Signaling component 830 may receive, from the base station, signaling indicative of a subset of the total number of ports, the subset including ports shared by other UEs having resource allocations that overlap with a resource allocation of the UE. In some cases, the signaling includes an RRC channel, DCI, a MAC CE, or any combination thereof. In some cases, the signaling is indicative of subsets of ports for respective sub-bands of a radio frequency spectrum band. In some cases, the signaling includes a downlink grant.

Subset component 835 may determine the subset based on the signaling.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
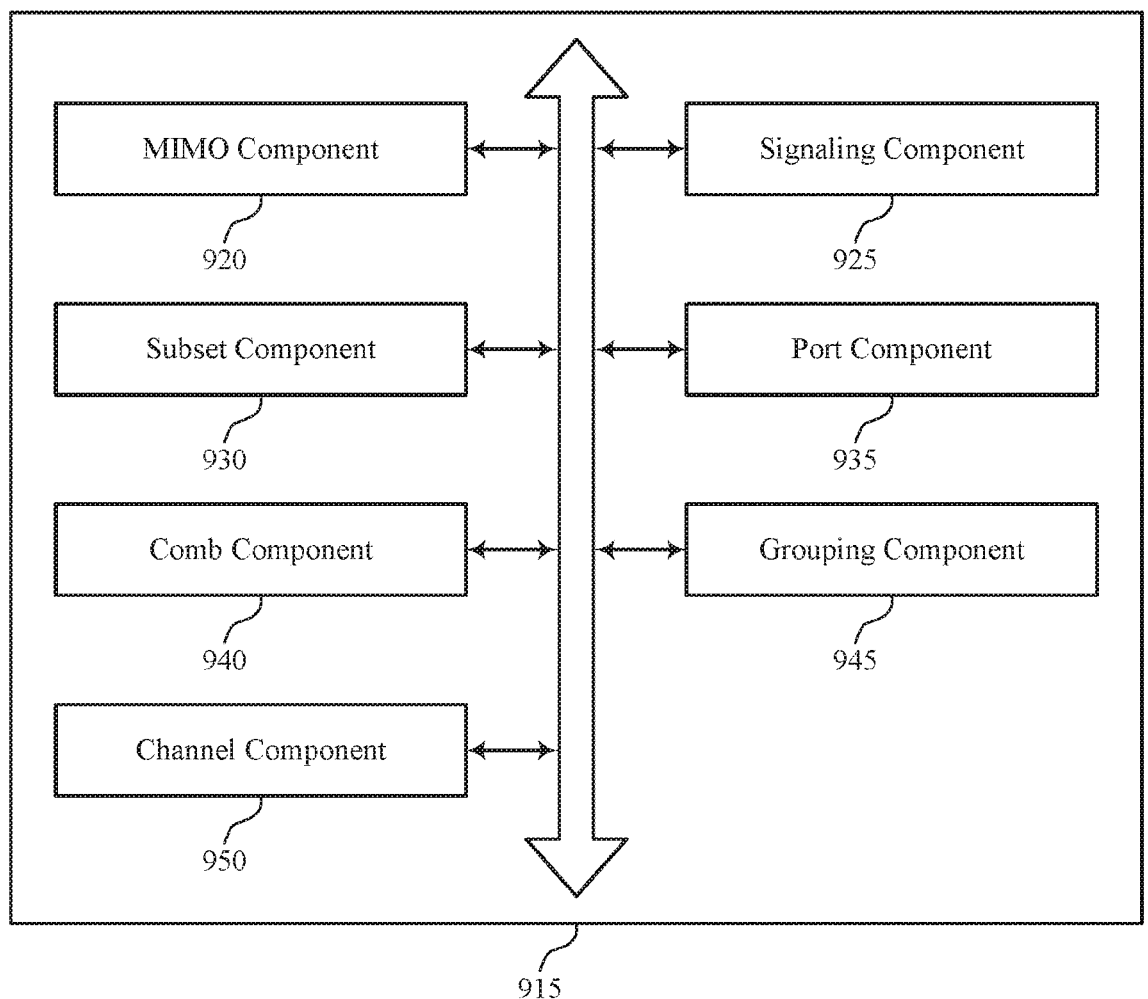

FIG. 9 shows a block diagram 900 of a UE port manager 915 that supports use of a multiple user port loading indication in accordance with aspects of the present disclosure. The UE port manager 915 may be an example of aspects of a UE port manager 715, a UE port manager 815, or a UE port manager 1015 described with reference to FIGS. 7, 8, and 10. The UE port manager 915 may include MIMO component 920, signaling component 925, subset component 930, port component 935, comb component 940, grouping component 945, and channel component 950. Each of these modules may communicate, directly or indirectly, with one another (e.g., via one or more buses).

MIMO component 920 may communicate with a base station via MU-MIMO, the base station including a total number of ports available for MU-MIMO.

Signaling component 925 may receive, from the base station, signaling indicative of a subset of the total number of ports, the subset including ports shared by other UEs having resource allocations that overlap with a resource allocation of the UE. In some cases, the signaling includes a RRC channel, DCI, a MAC CE, or any combination thereof. In some cases, the signaling is indicative of subsets of ports for respective sub-bands of a radio frequency spectrum band. In some cases, the signaling includes a downlink grant.

Subset component 930 may determine the subset based on the signaling. Subset component 930 may determine a second subset, where the second subset includes ports not shared by other UEs.

Port component 935 may receive a port indication indicating one or more ports to be used by the UE. In some cases, receiving the signaling indicative of the subset includes identifying an absence of multiplexed CDM ports among one or more ports allocated to the UE.

Comb component 940 may identify which of the number of combs to be used by the base station are to be used by the UE. In some cases, receiving the signaling indicative of the subset includes identifying a number of combs to be used by the base station in the resource allocation of the UE, where each comb includes a pattern of resource elements.

Grouping component 945 may determine that the one or more groupings that include the one or more ports to be used by the UE include the ports shared by other UEs. In some cases, receiving the signaling indicative of the subset includes identifying one or more groupings of the total number of ports and identifying at least one of the one or more groupings that includes ports shared by the other UEs. In some cases, identifying one or more groupings of the total number of ports includes receiving an identification of the one or more groupings via a RRC channel, a MAC CE, or any combination thereof. In some cases, identifying at least one of the one or more groupings that includes ports shared by the other UEs includes receiving a bitmap indicating the at least one of the one or more groupings. In some cases, the bitmap indicates the at least one of the one or more groupings without indicating groups that include ports assigned for use by the UE. In some cases, the one or more groupings are organized into separate lists, the method further including receiving a list indicator identifying which of the separate lists includes the at least one of the one or more groupings. In some cases, the bitmap corresponds to at least one of the one or more groupings in a look up table.

Channel component 950 may perform a channel estimation process based on the subset.

Figure 10:
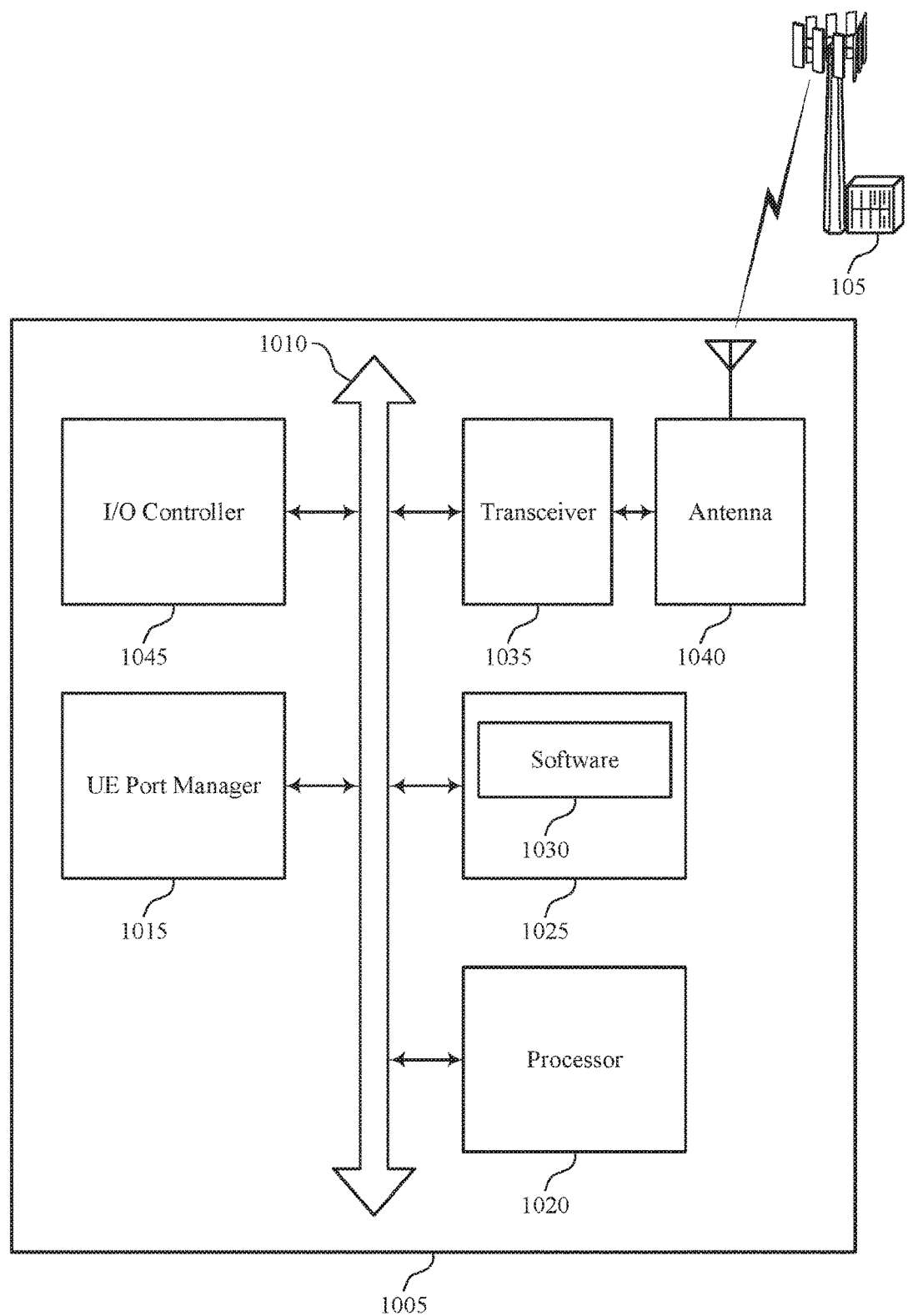
FIG. 10 illustrates a block diagram of a system including a user equipment (UE) that supports use of a multiple user port loading indication in accordance with aspects of the present disclosure.

FIG. 10 shows a diagram of a system 1000 including a device 1005 that supports use of a multiple user port loading indication in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE port manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting use of a multiple user port loading indication).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support use of a multiple user port loading indication. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID), MS-DOS®, MS-WINDOWS®, OS/2@, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
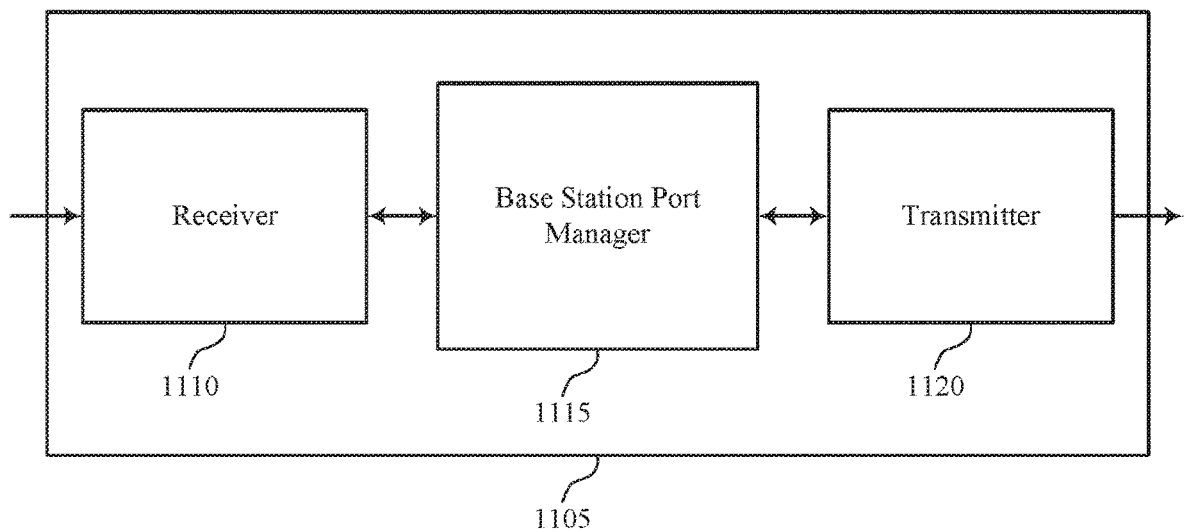
FIGS. 11 through 13 show block diagrams of a device that supports use of a multiple user port loading indication in accordance with aspects of the present disclosure.

FIG. 11 shows a block diagram 1100 of a wireless device 1105 that supports use of a multiple user port loading indication in accordance with aspects of the present disclosure. Wireless device 1105 may be an example of aspects of a base station 105 as described herein. Wireless device 1105 may include receiver 1110, base station port manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to use of a multiple user port loading indication). Information may be passed on to other components of the device. The receiver 1110 may be an example of aspects of the transceiver 1435 described with reference to FIG. 14. The receiver 1110 may utilize a single antenna or a set of antennas.

Base station port manager 1115 may be an example of aspects of the base station port manager 1415 described with reference to FIG. 14.

Base station port manager 1115 and/or at least some of its various sub-components may be implemented in hardware, software executed by a processor, firmware, or any combination thereof. If implemented in software executed by a processor, the functions of the base station port manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station port manager 1115 and/or at least some of its various sub-components may be physically located at various positions, including being distributed such that portions of functions are implemented at different physical locations by one or more physical devices. In some examples, base station port manager 1115 and/or at least some of its various sub-components may be a separate and distinct component in accordance with various aspects of the present disclosure. In other examples, base station port manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station port manager 1115 may communicate with a UE via MU-MIMO, the base station including a total number of ports available for MU-MIMO and transmit to the UE signaling indicative of a subset of the total number of ports, the subset including ports shared by other UEs having resource allocations that overlap with a resource allocation of the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
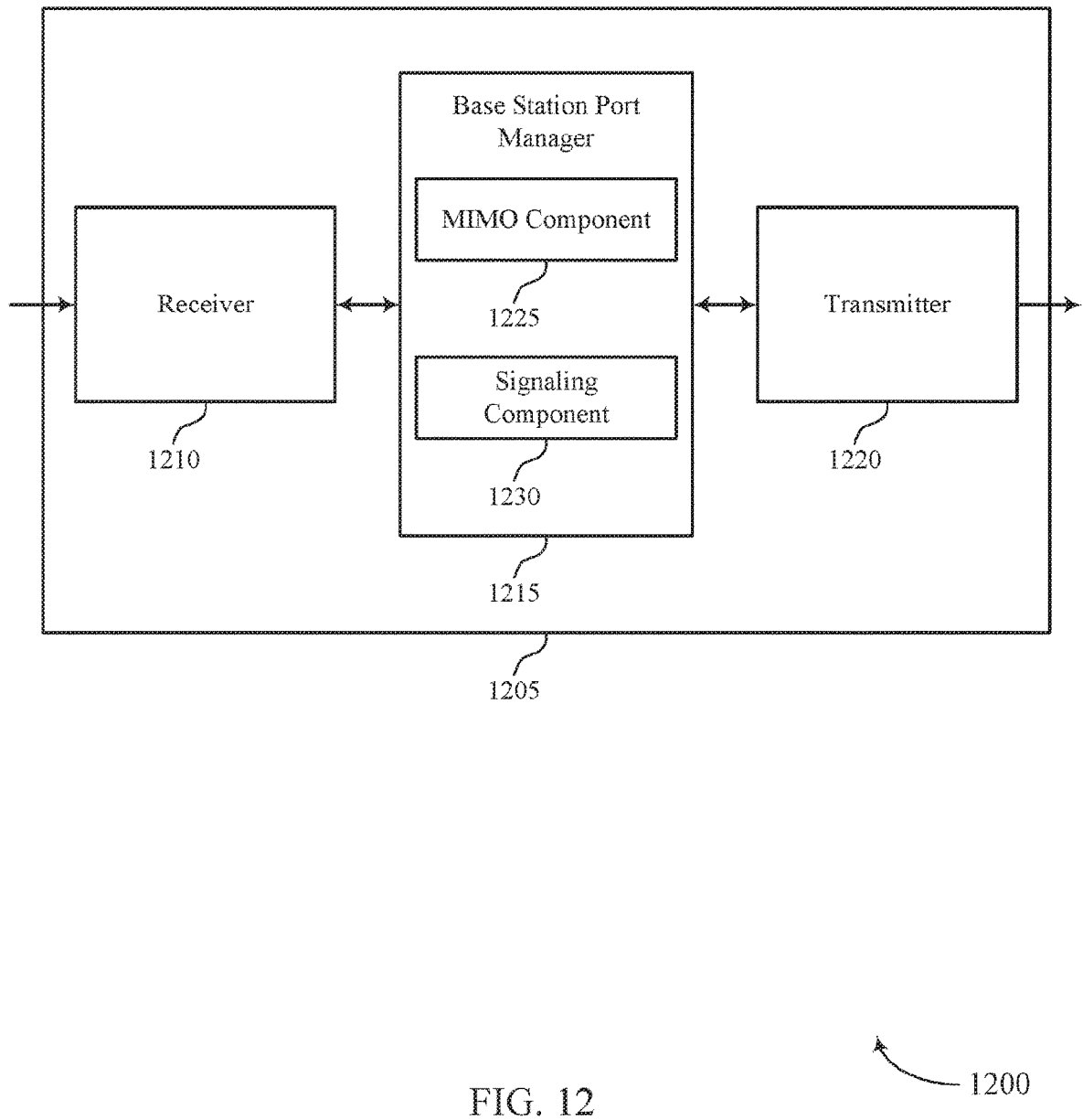

FIG. 12 shows a block diagram 1200 of a wireless device 1205 that supports use of a multiple user port loading indication in accordance with aspects of the present disclosure. Wireless device 1205 may be an example of aspects of a wireless device 1105 or a base station 105 as described with reference to FIG. 11. Wireless device 1205 may include receiver 1210, base station port manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to use of a multiple user port loading indication). Information may be passed on to other components of the device. The receiver 1210 may be an example of aspects of the transceiver 1435 described with reference to FIG. 14. The receiver 1210 may utilize a single antenna or a set of antennas.

Base station port manager 1215 may be an example of aspects of the base station port manager 1415 described with reference to FIG. 14.

Base station port manager 1215 may also include MIMO component 1225 and signaling component 1230.

MIMO component 1225 may communicate with a UE via MU-MIMO, the base station including a total number of ports available for MU-MIMO.

Signaling component 1230 may transmit to the UE signaling indicative of a subset of the total number of ports, the subset including ports shared by other UEs having resource allocations that overlap with a resource allocation of the UE. In some cases, the signaling is a RRC channel, DCI, a MAC CE, or any combination thereof. In some cases, the signaling is indicative of subsets of ports for respective sub-bands of a radio frequency spectrum band. In some cases, the signaling includes a downlink grant.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
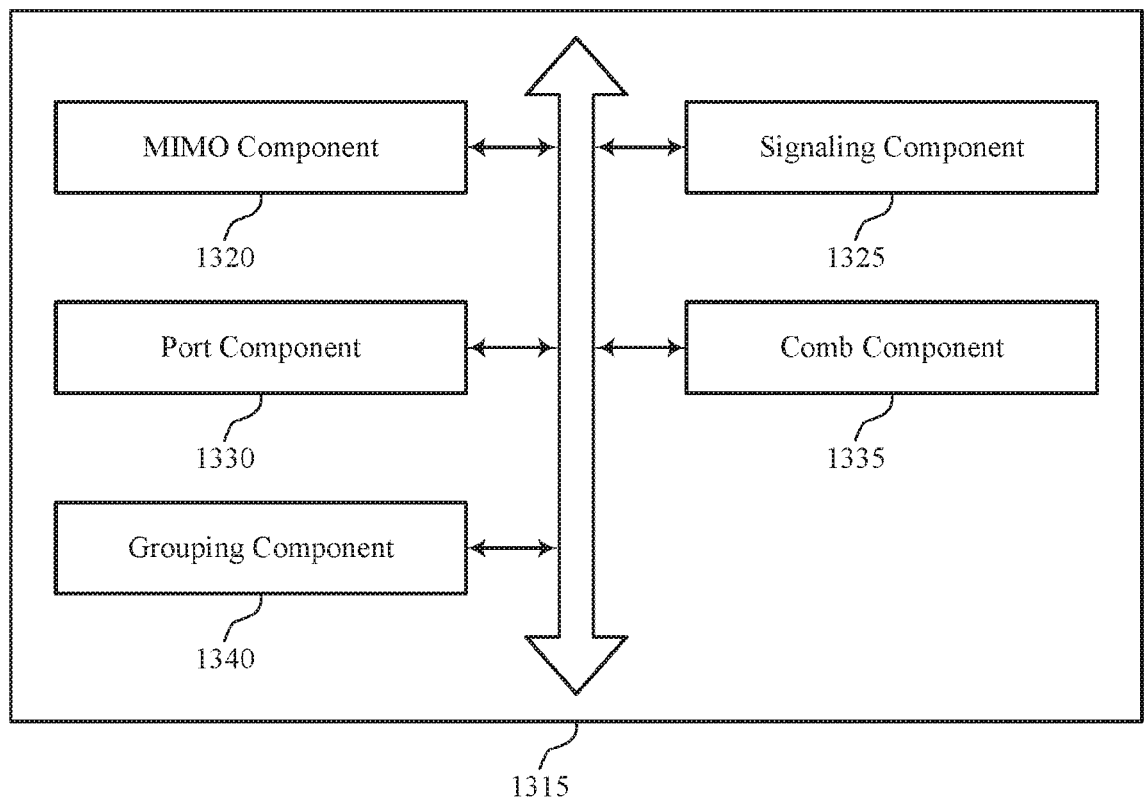

FIG. 13 shows a block diagram 1300 of a base station port manager 1315 that supports use of a multiple user port loading indication in accordance with aspects of the present disclosure. The base station port manager 1315 may be an example of aspects of a base station port manager 1415 described with reference to FIGS. 11, 12, and 14. The base station port manager 1315 may include MIMO component 1320, signaling component 1325, port component 1330, comb component 1335, and grouping component 1340. Each of these modules may communicate, directly or indirectly, with one another (e.g., via one or more buses).

MIMO component 1320 may communicate with a UE via MU-MIMO, the base station including a total number of ports available for MU-MIMO.

Signaling component 1325 may transmit to the UE signaling indicative of a subset of the total number of ports, the subset including ports shared by other UEs having resource allocations that overlap with a resource allocation of the UE. In some cases, the signaling is a RRC channel, DCI, a MAC CE, or any combination thereof. In some cases, the signaling is indicative of subsets of ports for respective sub-bands of a radio frequency spectrum band. In some cases, the signaling includes a downlink grant.

Port component 1330 may transmit a port indication indicating one or more ports to be used by the UE. In some cases, transmitting the signaling indicative of the subset includes indicating, to the UE, an absence of multiplexed CDM ports among one or more ports allocated to the UE. In some other cases, transmitting the signaling indicative of the subset may include indicating a second subset of ports not shared by other UEs.

Comb component 1335 may indicate which of the number of combs to be used by the base station are to be used by the UE. In some cases, transmitting the signaling indicative of the subset includes indicating, to the UE, a number of combs to be used by the base station in the resource allocation of the UE.

Grouping component 1340 may identify one or more groupings. In some cases, transmitting the signaling indicative of the subset includes identifying, to the UE, one or more groupings of the total number of ports and indicating at least one of the one or more groupings that includes ports shared by the other UEs. In some cases, identifying one or more groupings of the total number of ports includes transmitting an identification of the one or more groupings via a RRC channel, a MAC CE, or any combination thereof. In some cases, indicating at least one of the one or more groupings that includes ports shared by the other UEs includes transmitting a bitmap indicating the at least one of the one or more groupings. In some cases, the bitmap indicates the at least one of the one or more groupings without indicating groups that include ports assigned for use by the UE. In some cases, the one or more groupings are organized into separate lists, the method further including transmitting a list indicator identifying which of the separate lists includes the at least one of the one or more groupings.

Figure 14:
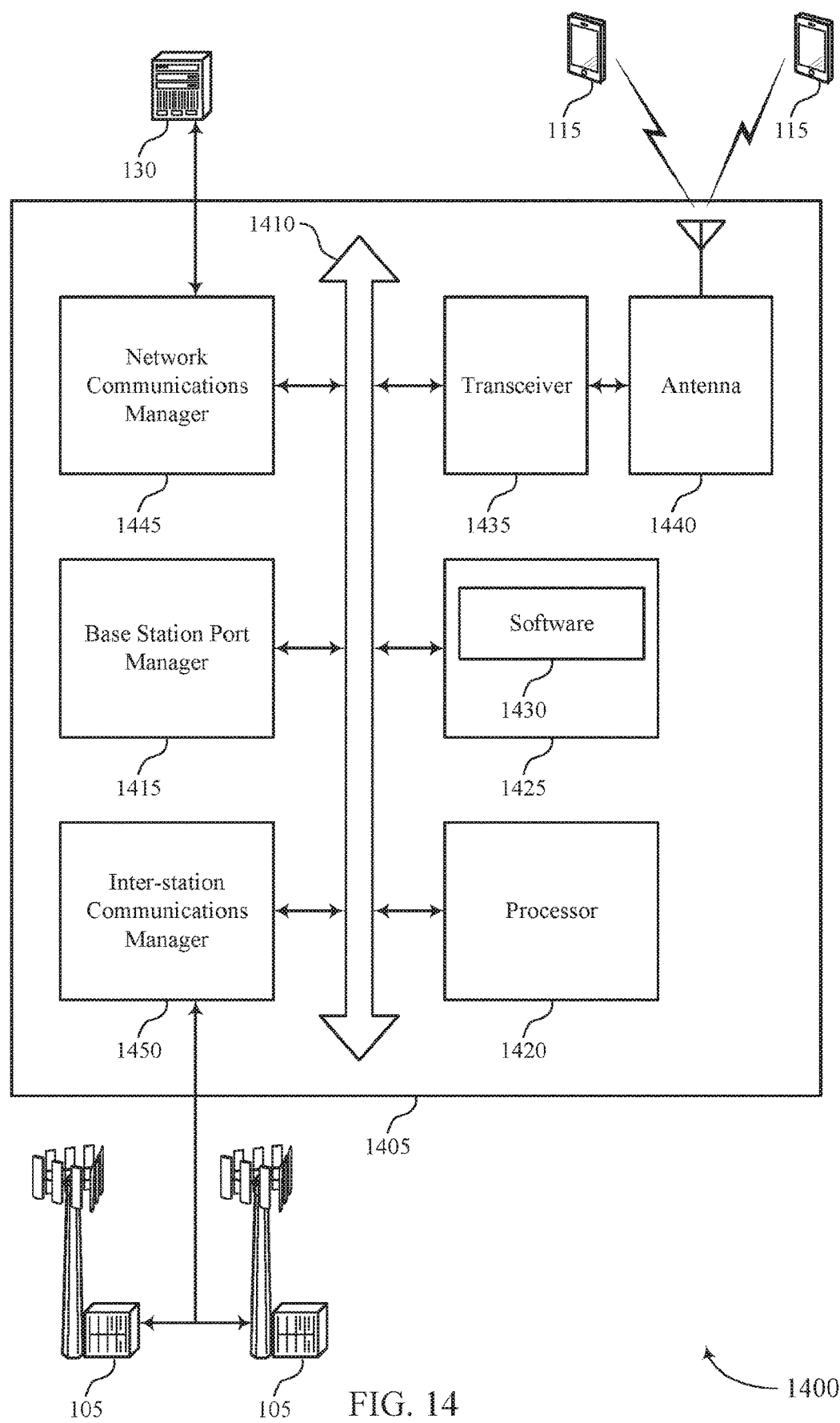
FIG. 14 illustrates a block diagram of a system including a base station that supports use of a multiple user port loading indication in accordance with aspects of the present disclosure.

FIG. 14 shows a diagram of a system 1400 including a device 1405 that supports use of a multiple user port loading indication in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station port manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting use of a multiple user port loading indication).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support use of a multiple user port loading indication. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
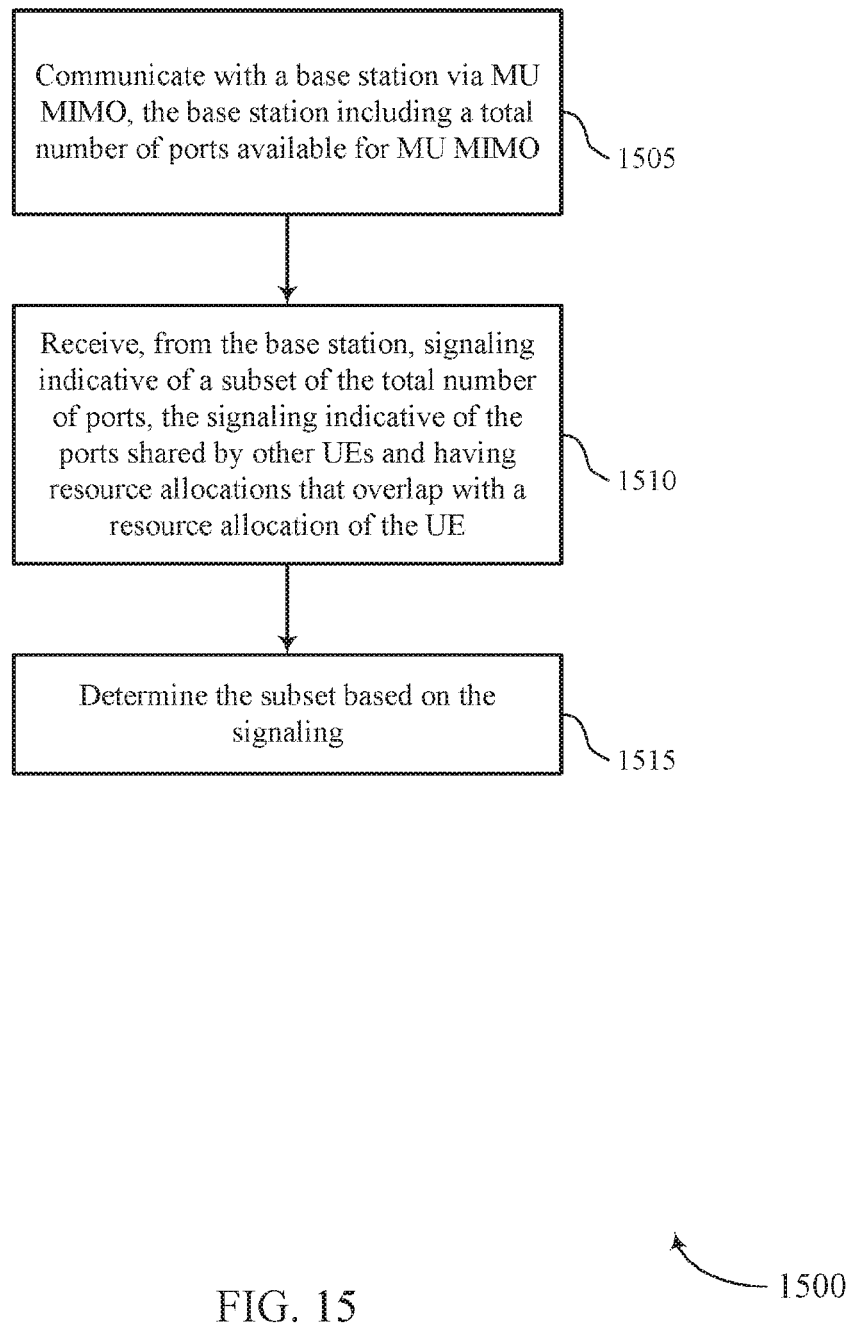
FIGS. 15 through 16 illustrate methods for use of a multiple user port loading indication in accordance with aspects of the present disclosure.

FIG. 15 shows a flowchart illustrating a method 1500 for use of a multiple user port loading indication in accordance with aspects of the present disclosure. The operations of method 1500 may be implemented by a UE 115 or its components as described herein. For example, the operations of method 1500 may be performed by a UE port manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may communicate with a base station via MU-MIMO, the base station including a total number of ports available for MU-MIMO. The operations of block 1505 may be performed according to the methods described herein. In certain examples, aspects of the operations of block 1505 may be performed by a MIMO component as described with reference to FIGS. 7 through 10.

At block 1510 the UE 115 may receive, from the base station, signaling indicative of a subset of the total number of ports, the subset including ports shared by other UEs having resource allocations that overlap with a resource allocation of the UE. The operations of block 1510 may be performed according to the methods described herein. In certain examples, aspects of the operations of block 1510 may be performed by a signaling component as described with reference to FIGS. 7 through 10.

At block 1515 the UE 115 may determine the subset based at least in part on the signaling. The operations of block 1515 may be performed according to the methods described herein. In certain examples, aspects of the operations of block 1515 may be performed by a subset component as described with reference to FIGS. 7 through 10.

Figure 16:
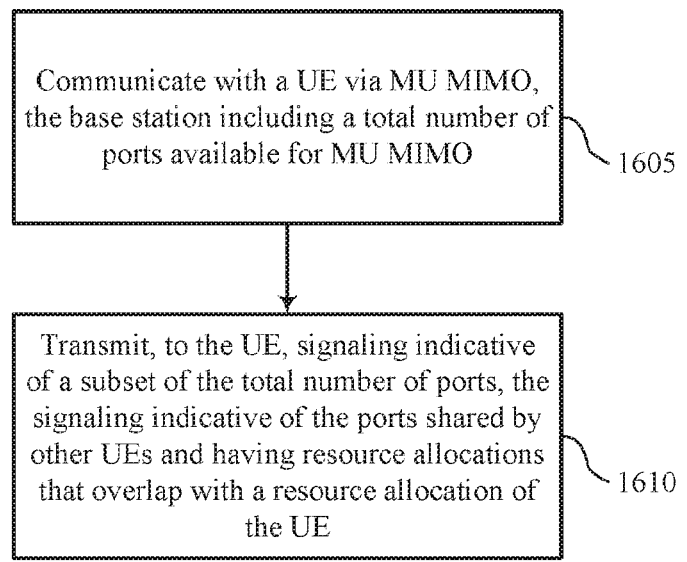

FIG. 16 shows a flowchart illustrating a method 1600 for use of a multiple user port loading indication in accordance with aspects of the present disclosure. The operations of method 1600 may be implemented by a base station 105 or its components as described herein. For example, the operations of method 1600 may be performed by a base station port manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may communicate with a UE via MU-MIMO, the base station including a total number of ports available for MU-MIMO. The operations of block 1605 may be performed according to the methods described herein. In certain examples, aspects of the operations of block 1605 may be performed by a MIMO component as described with reference to FIGS. 11 through 14.

At block 1610 the base station 105 may transmit to the UE signaling indicative of a subset of the total number of ports, the subset including ports shared by other UEs having resource allocations that overlap with a resource allocation of the UE. The operations of block 1610 may be performed according to the methods described herein. In certain examples, aspects of the operations of block 1610 may be performed by a signaling component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    communicating with a network device via multi-user (MU) multiple-input multiple-output (MIMO),
    receiving, from the network device, a control signal indicating a subset of a total number of ports of the network device available for MU-MIMO, the control signal indicating at least one grouping of a plurality of groupings of the subset of the total number of ports, wherein the at least one grouping of the plurality of groupings comprises ports shared by other UEs having resource allocations that overlap with a resource allocation of a downlink shared channel for the UE; and
    receiving one or more reference signals based at least in part on the at least one grouping of the plurality of groupings comprising ports shared by other UEs having resource allocations that overlap with the resource allocation of the downlink shared channel for the UE.

2. The method of claim 1, further comprising:
    determining at least one grouping of the plurality of groupings of the subset of the total number of ports that comprises ports not shared by other UEs, wherein the determining is based at least in part on the control signal.

3. The method of claim 1, wherein receiving the control signal indicative of the subset comprises:
    identifying an absence of multiplexed code division multiplexing (CDM) ports among one or more ports allocated to the UE.

4. The method of claim 1, wherein receiving the control signal comprises:
    identifying a number of combs to be used by the network device in the resource allocation of the downlink shared channel for the UE, wherein each comb comprises a pattern of resource elements indicated by a resource element spacing in a frequency domain.

5. The method of claim 4, further comprising:
    identifying which of the number of combs to be used by the network device are to be used by the UE.

6. The method of claim 1, wherein receiving the control signal comprises:
    receiving an identification of the at least one grouping via a radio resource control (RRC) channel, a media access control (MAC) control element (CE), or any combination thereof.

7. The method of claim 1, wherein receiving the control signal comprises:
    receiving a bitmap indicating the at least one grouping of the plurality of groupings.

8. The method of claim 7, wherein the bitmap indicates the at least one grouping of the plurality of groupings without indicating groups that comprise ports assigned for use by the UE.

9. The method of claim 7, wherein the plurality of groupings is organized into separate lists, the method further comprising:
    receiving a list indicator identifying which of the separate lists comprises the at least one grouping of the plurality of groupings.

10. The method of claim 7, wherein the bitmap corresponds to at least one grouping of the plurality groupings in a look up table.

11. The method of claim 1, further comprising:
    receiving a port indication indicating one or more ports to be used by the UE; and
    determining that the plurality of groupings that comprise the one or more ports to be used by the UE comprise the ports shared by the other UEs.

12. The method of claim 1, wherein the signaling comprises a radio resource control (RRC) channel, downlink control information (DCI), a media access control (MAC) control element (CE), or any combination thereof.

13. The method of claim 1, wherein the control signal is indicative of subsets of ports for respective sub-bands of a radio frequency spectrum band.

14. The method of claim 1, wherein the control signal comprises a downlink grant.

15. A method for wireless communications at a network device, comprising:
   communicating with a user equipment (UE) via multi-user (MU) multiple-input multiple-output (MIMO); and
   transmitting, to the UE, a control signal indicating a subset of a total number of ports of the network device available for MU-MIMO, the control signal indicating at least one grouping of a plurality of groupings of the subset of the total number of ports, the at least one grouping of the plurality of groupings comprising ports shared by other UEs having resource allocations that overlap with a resource allocation of a downlink shared channel for the UE
   transmitting one or more reference signals based at least in part on the at least one grouping of the plurality of groupings comprising ports shared by other UEs having resource allocations that overlap with the resource allocation of the downlink shared channel for the UE.

16. The method of claim 15, wherein the control signal is indicative of subsets of ports for respective sub-bands of a radio frequency spectrum band.

17. The method of claim 16, wherein transmitting the control signal comprises:
   indicating, to the UE, at least one grouping of the plurality of groupings of the subset of the total number of ports that comprises ports not shared by other UEs, wherein the indication is based at least in part on the control signal.

18. The method of claim 16, wherein transmitting the control signal comprises:
   indicating, to the UE, an absence of multiplexed code division multiplexing (CDM) ports among one or more ports allocated to the UE.

19. The method of claim 16, wherein transmitting the control signal comprises:
   indicating, to the UE, a number of combs to be used by the network device in the resource allocation of the downlink shared channel for the UE, wherein each comb comprises a pattern of resource elements indicated by a resource element spacing in a frequency domain.

20. The method of claim 19, further comprising:
   indicating which of the number of combs to be used by the network device are to be used by the UE.

21. The method of claim 16, wherein transmitting the control signal comprises:
   transmitting an identification of the at least one grouping via a radio resource control (RRC) channel, a media access control (MAC) control element (CE), or any combination thereof.

22. The method of claim 16, wherein transmitting the control signal comprises:
   transmitting a bitmap indicating the at least one grouping of the plurality of groupings.

23. The method of claim 22, wherein the bitmap indicates the at least one grouping of the plurality of groupings without indicating groups that comprise ports assigned for use by the UE.

24. The method of claim 22, wherein the plurality of groupings is organized into separate lists, the method further comprising:
   transmitting a list indicator identifying which of the separate lists comprises the at least one grouping of the plurality of groupings.

25. The method of claim 16, further comprising:
   transmitting a port indication indicating one or more ports to be used by the UE.

26. The method of claim 16, wherein the control signal is a radio resource control (RRC) channel, downlink control information (DCI), a media access control (MAC) control element (CE), or any combination thereof.

27. The method of claim 16, wherein the control signal comprises a downlink grant.

* * * * *